(12) United States Patent
Lu et al.

(10) Patent No.: US 12,407,492 B2
(45) Date of Patent: Sep. 2, 2025

(54) METHOD AND SYSTEM FOR COMMUNICATING WITH AUTHENTICATOR

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 222 days.

(21) Appl. No.: 18/027,727

(22) PCT Filed: Nov. 23, 2021

(86) PCT No.: PCT/CN2021/132580
§ 371 (c)(1),
(2) Date: Mar. 22, 2023

(87) PCT Pub. No.: WO2022/142874
PCT Pub. Date: Jul. 7, 2022

(65) Prior Publication Data
US 2023/0412364 A1 Dec. 21, 2023

(30) Foreign Application Priority Data
Dec. 31, 2020 (CN) .......................... 202011619763.6

(51) Int. Cl.
*H04L 9/08* (2006.01)
*H04L 9/14* (2006.01)
(Continued)

(52) U.S. Cl.
CPC .......... *H04L 9/0819* (2013.01); *H04L 9/0861* (2013.01); *H04L 9/14* (2013.01); *H04L 9/3073* (2013.01); *H04W 12/06* (2013.01)

(58) Field of Classification Search
CPC ... H04L 9/0643; H04L 9/0819; H04L 9/0844; H04L 9/0861; H04L 9/0869; H04L 9/14;
(Continued)

(56) References Cited

U.S. PATENT DOCUMENTS 7,907,901 B1 * 3/2011 Kahn .................... H04W 12/50
455/41.1
12,261,649 B1 * 3/2025 Erdozain, Jr. ........ H04B 10/114
(Continued)

FOREIGN PATENT DOCUMENTS

CN 101431414 A 5/2009
CN 101645890 A 2/2010
(Continued)

OTHER PUBLICATIONS

International Search Report issue on Jan. 20, 2022, in corresponding International Patent Application No. PCT/CN2021/132580, 6 pages.
(Continued)

*Primary Examiner* — Eric W Shepperd
(74) *Attorney, Agent, or Firm* — Maier & Maier, PLLC

(57) ABSTRACT

A method and system for communicating with an authenticator, which belongs to communication technology field. The method includes: the client generates a first client identification, a first authenticator identification and a first session key, broadcasts data including the first client identification according to a preset time interval; the authenticator scans the broadcast data, obtain a third key to verify the first client identification, generates a second authenticator identification and a second session key if the verifying is successful, notifies that the verifying is successful, stops scanning and broadcasts broadcast data including the second authenticator identification; the client stops broadcasting and scans the broadcast data sent from the authenticator, obtains and verifies the second authenticator identification in
(Continued)

the broadcast data, establishes the Bluetooth connection with the authenticator if the verifying is successful; the client performs handshake operation and encryption communication operation.

20 Claims, 16 Drawing Sheets

(51) Int. Cl.
*H04L 9/30* (2006.01)
*H04W 12/06* (2021.01)

(58) Field of Classification Search
CPC .. H04L 9/3073; H04L 63/0869; H04W 12/06; H04W 12/50
See application file for complete search history.

(56) References Cited

U.S. PATENT DOCUMENTS

| | | | |
|---|---|---|---|
| 2006/0129800 A1 | 6/2006 | Lauter et al. | |
| 2007/0222555 A1* | 9/2007 | Tengler | H04L 9/3263 340/902 |
| 2009/0180612 A1* | 7/2009 | Leu | H04N 21/2396 725/114 |
| 2016/0085960 A1* | 3/2016 | Priev | G06F 21/31 726/7 |
| 2017/0118645 A1* | 4/2017 | Zarakas | G06Q 20/3829 |
| 2017/0289155 A1* | 10/2017 | Kerai | H04W 72/30 |
| 2018/0145979 A1 | 5/2018 | Lu et al. | |
| 2019/0166498 A1* | 5/2019 | Boettcher | H04L 63/107 |
| 2020/0036569 A1* | 1/2020 | Mekenkamp | H04L 65/40 |

FOREIGN PATENT DOCUMENTS

| | | |
|---|---|---|
| CN | 105071939 A | 11/2015 |
| CN | 105187450 A | 12/2015 |
| CN | 106102058 A | 11/2016 |
| CN | 106161449 A | 11/2016 |
| CN | 107969001 A | 4/2018 |
| CN | 109302369 A | 2/2019 |
| CN | 112291774 A | 1/2021 |
| CN | 112311544 A | 2/2021 |

OTHER PUBLICATIONS

Office Action, issued Feb. 7, 2021, in corresponding Chinese Patent Application No. 202011619763.6, 8 pages.
Notice of Allowance, issued Feb. 20, 2021, in corresponding Chinese Patent Application No. 202011619763.6, 4 pages.

* cited by examiner

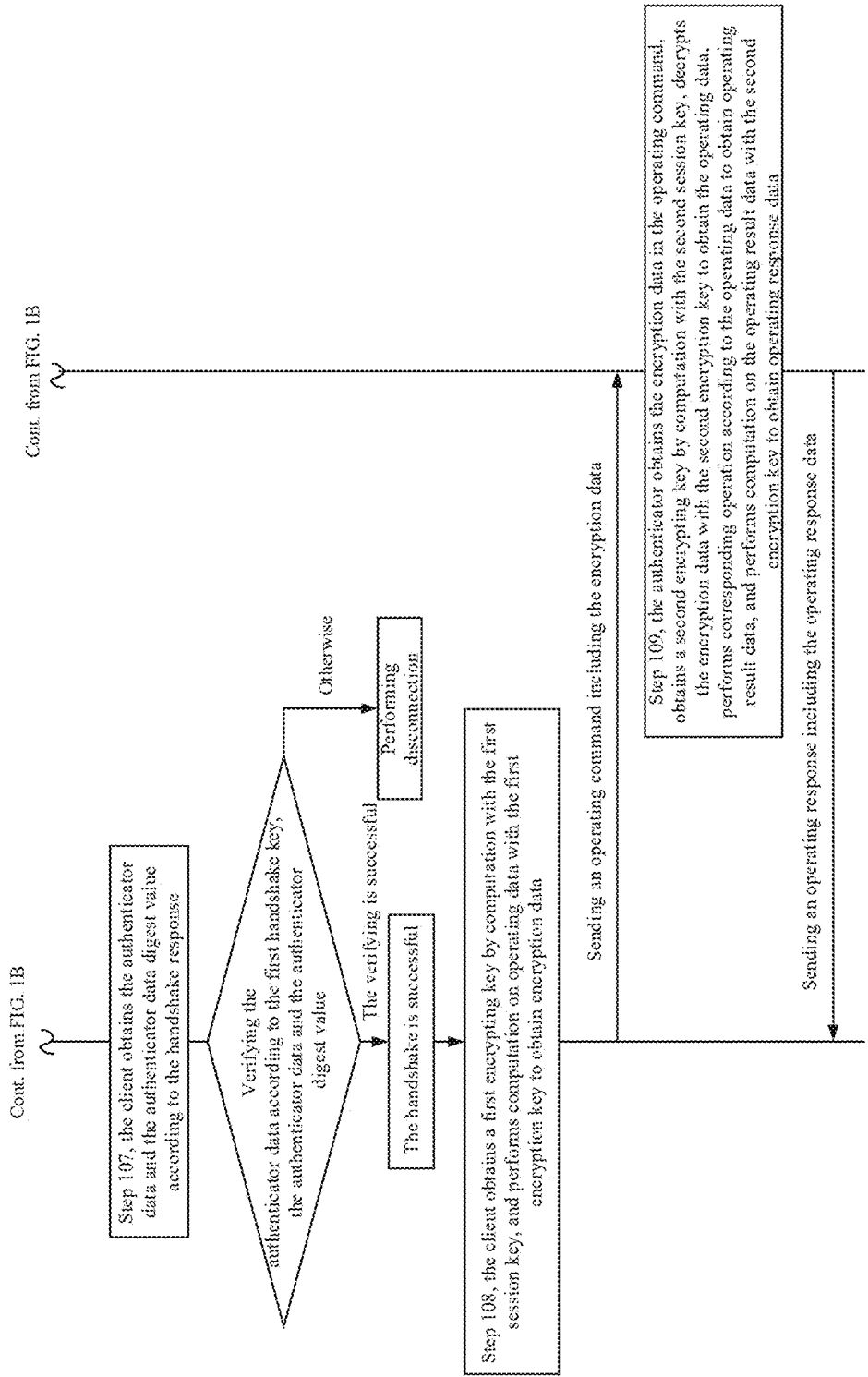

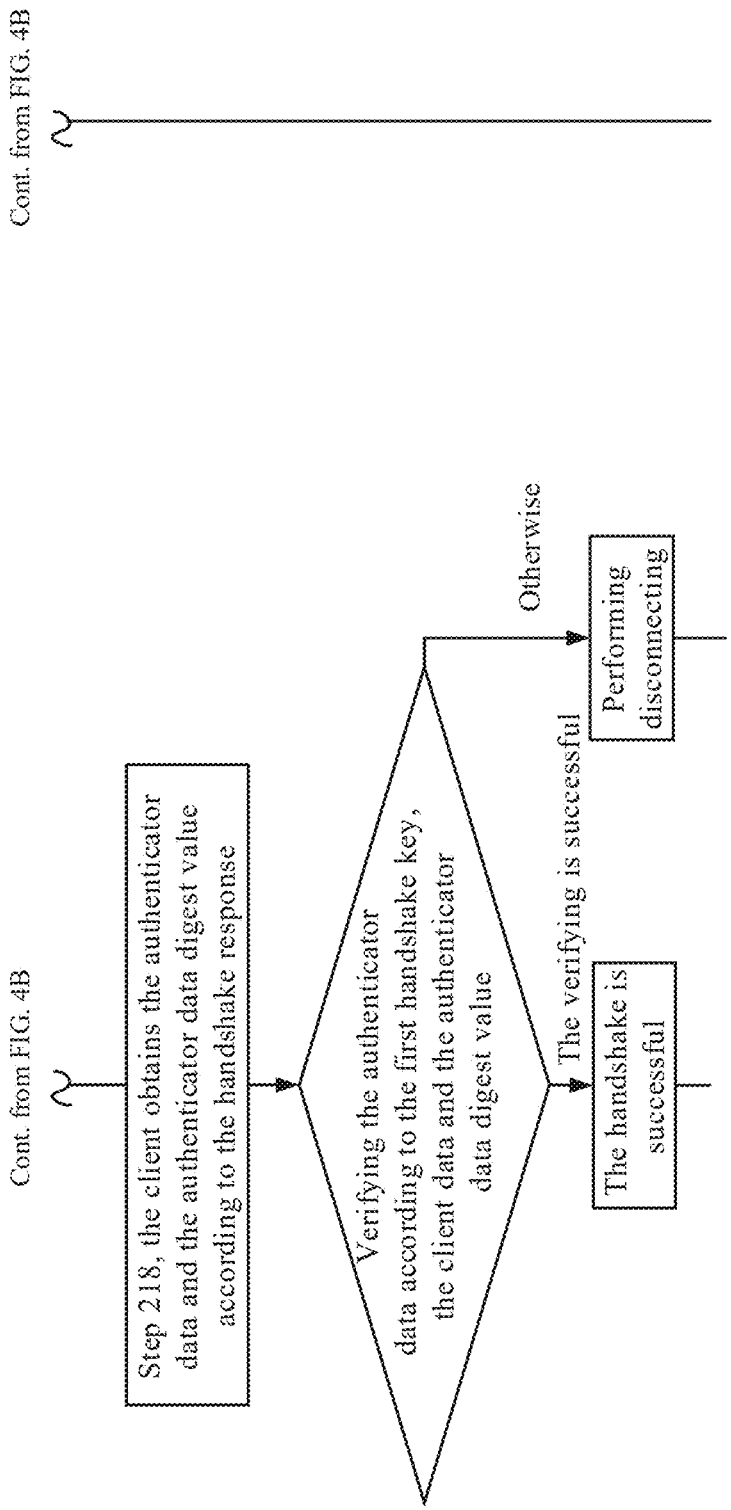

METHOD AND SYSTEM FOR COMMUNICATING WITH AUTHENTICATOR

This application is a National Stage of the International Application No. PCT/CN2021/132580, filed on Nov. 23, 2021, which claims priority to Chinese Patent Application No. 202011619763.6, filed to China National Intellectual Property Administration on Dec. 31, 2020, entitled "METHOD AND SYSTEM FOR COMMUNICATING WITH AUTHENTICATOR", both of the aforementioned applications are hereby incorporated by reference in their entireties.

TECHNICAL FIELD

The present disclosure relates to the field of communications and, in particular, to a method and system for communicating with an authenticator.

BACKGROUND

In the related art, standard Bluetooth uses pairing of system-level, i.e. pairing between one Bluetooth device and another Bluetooth device. That kind of paring has following disadvantages: on the one hand, all applications on the paired device can obtain data transmitted by the other Bluetooth device after pairing, resulting in data insecurity: on the other hand, it is very unfriendly to the application UI, and the slave device is completely passive during the connection process, and the master device cannot be selected. In addition, there are some Bluetooth devices that do not even need to be paired to communicate, and these pairing connection methods are easy to cause sensitive data to be stolen and have low security.

SUMMARY

In order to solve the problems existing in the related art, embodiments of the present disclosure provides a method for communicating with an authenticator.

In one aspect, the method for communicating with an authentication provided by an embodiment of the present disclosure includes:

Step S1, obtaining, by a client, a first key stored in the client, generating a first client identification and a first authenticator identification according to the first key, obtaining a second key corresponding to the first key, generating a first session key according to the second key, and broadcasting data including the first client identification according to a preset time interval:

Step S2, scanning, by the authenticator, the broadcast data, obtaining the first client identification in the broadcast data, obtaining a third key stored in the authenticator, verifying the first client identification according to the third key, executing Step S3 if the verifying is successful, rescanning the broadcast data if the verifying is failed:

Step S3, generating, by the authenticator, a second authenticator identification according to the third key, obtaining a fourth key corresponding to the third key, generating a second session key according to the fourth key, notifying that the verifying of the first client identification is successful, and stopping scanning and broadcasting broadcast data including the second authenticator identification:

Step S4, stopping, by the client, broadcasting, starting to scan the broadcast data sent from the authenticator, parsing the broadcast data obtained by scanning to obtain the second authenticator identification, and verifying the second authenticator identification, establishing a Bluetooth connection with the authenticator and executing Step S5 if the verifying is successful, ending the procedure if the verifying is failed:

Step S5, obtaining, by the client, a first handshake key by computation with the first session key, performing computation on the client data with the first handshake key to obtain a client data digest value, and sending a handshake command including the client data and the client data digest value to the authenticator;

Step S6, obtaining, by the authenticator, the client data and the client data digest value according to the handshake command, obtaining a second handshake key by computation with the second session key, verifying the client data according to the second handshake key, the client data and the client data digest value, performing computation on the authenticator data with the second handshake key to obtain an authenticator data digest value if the verifying is successful, and sending a handshake response including the authenticator data and the authenticator data digest value to the client:

Step S7, obtaining, by the client, the authenticator data and the authenticator data digest value according to the handshake response, and verifying the authenticator data according to the first handshake key, the authenticator data and the authenticator digest value, executing Step S8 in case of a successful handshake if the verifying is successful; otherwise, performing disconnection;

Step S8, obtaining, by the client, a first encryption key by computation with the first session key, performing computation on operating data with the first encryption key to obtain encrypted data, and sending an operating command including the encrypted data to the authenticator; and Step S9, obtaining, by the authenticator, the encrypted data in the operating command, obtaining a second encryption key by computation with the second session key, decrypting the encrypting data with the second encryption key to obtain the operating data, performing corresponding operation according to the operating data to obtain operating result data, performing computation on the operating result data with the second encryption key to obtain operating response data, and sending an operating response including the operating response data to the client.

In another aspect, an embodiment of the present disclosure provides a system for communicating with an authenticator, the system includes: a client and an authenticator:

a first obtaining module, configured to obtain a first key stored in the client:

a first generating module, configured to generate a first client identification and a first authenticator identification according to the first key:

the first obtaining module is further configured to obtain a second key corresponding to the first key:

a second generating module, configured to generate a first session key according to the second key:

a first broadcasting module, configured to broadcast data including the first client identification according to a preset time interval:

a first scanning and parsing module, configured to stop broadcasting, start to scan broadcast data sent from the authenticator, and parse the broadcast data obtained by scanning:

a first verifying module, configured to verify a second authenticator identification:

a third generating module, configured to obtain a first handshake key by computation with the first session key, and perform computation on the client data with the first handshake key to obtain a client data digest value:

a first sending module, configured to send a handshake command including the client data and the client data digest value to the authenticator:

the first obtaining module is further configured to obtain authenticator data and a authenticator digest value according to a handshake response:

a second verifying module, configured to verify the authenticator data according to the first handshake key, the authenticator data and the authenticator digest value:

an encrypting and processing module, configured to obtain a first encryption key by computation with the first session key, perform computation on operating data with the first encryption key to obtain encrypted data; and the first sending module is further configured to send an operating command including the encrypted data to the authenticator;

the authenticator includes:

a second scanning module, configured to scan the broadcast data and obtain the first client identification from the broadcast data:

a second obtaining module, configured to obtain a third key stored in the authenticator:

a third verifying module, configured to verify the first client identification according to the third key:

a fourth generating module, configured to generate a second authenticator identification according to the third key:

the second obtaining module is further configured to obtain a fourth key corresponding to the third key:

a fifth generating module, configured to generate a second session key according to the fourth key:

a notifying module, configured to notify that the verifying of the first client identification is successful:

a second broadcasting module, configured to stop scanning and broadcast the broadcast data including the second authenticator identification;

the second obtaining module is further configured to obtain the client data and the client data digest value according to the handshake command:

a sixth generating module, configured to obtain a second handshake key by computation with the second session key:

a fourth verifying module, configured to verify the client data according to the second handshake key, the client data and the client data digest value:

a seventh generating module, configured to perform computation on the authenticator data with the second handshake key to obtain an authenticator data digest value;

a second sending module, configured to send the handshake response including the authenticator data and the authenticator data digest value to the client;

the second obtaining module is further configured to obtain the encrypted data in the operating command:

an eighth generating module, configured to obtain a second encryption key by computation with the second session key:

a decrypting and processing module, configured to decrypt the encrypted data with the second encryption key to obtain operating data, perform corresponding operation according to the operating data to obtain operating result data, and perform computation on the operating result data with the second encryption key to obtain operating response data; and the second sending module is further configured to send an operating response including the operating response data to the client.

The advantages of the present disclosure are: in the present disclosure, on the basis of the Bluetooth pairing connection among devices, a client and an authenticator establish an application-level Bluetooth pairing connection, perform bidirectional broadcast scanning authentication between the client and the authenticator during the connection process, generate an encryption key according to a session key after successful verifying and connecting, and encrypt the data during the communication process through the encryption key to ensure that the data is not stolen during the transmission process. By using the method provided by the present disclosure, data security is enhanced in the transmission process, thus the interests of users are ensured.

BRIEF DESCRIPTION OF DRAWINGS

FIGS. 1A-1C are flow charts of a method for communicating with an authenticator provided by Embodiment 1 of the present disclosure.

FIGS. 4A-4C are flow charts of a method for a handshake phase in the method for communicating provided by Embodiment 2 of the present disclosure.

DESCRIPTION OF EMBODIMENTS

The technical solutions in the embodiments of the present disclosure will be clearly and completely described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without inventive efforts are within the scope of the present disclosure.

Embodiment 1

Embodiment 1 provides a method for communicating with an authenticator: the method is adapted to a system including a client and the authenticator, in which the client is an application installed in a mobile terminal with Bluetooth function, the authenticator has Bluetooth function.

Figure 1A:
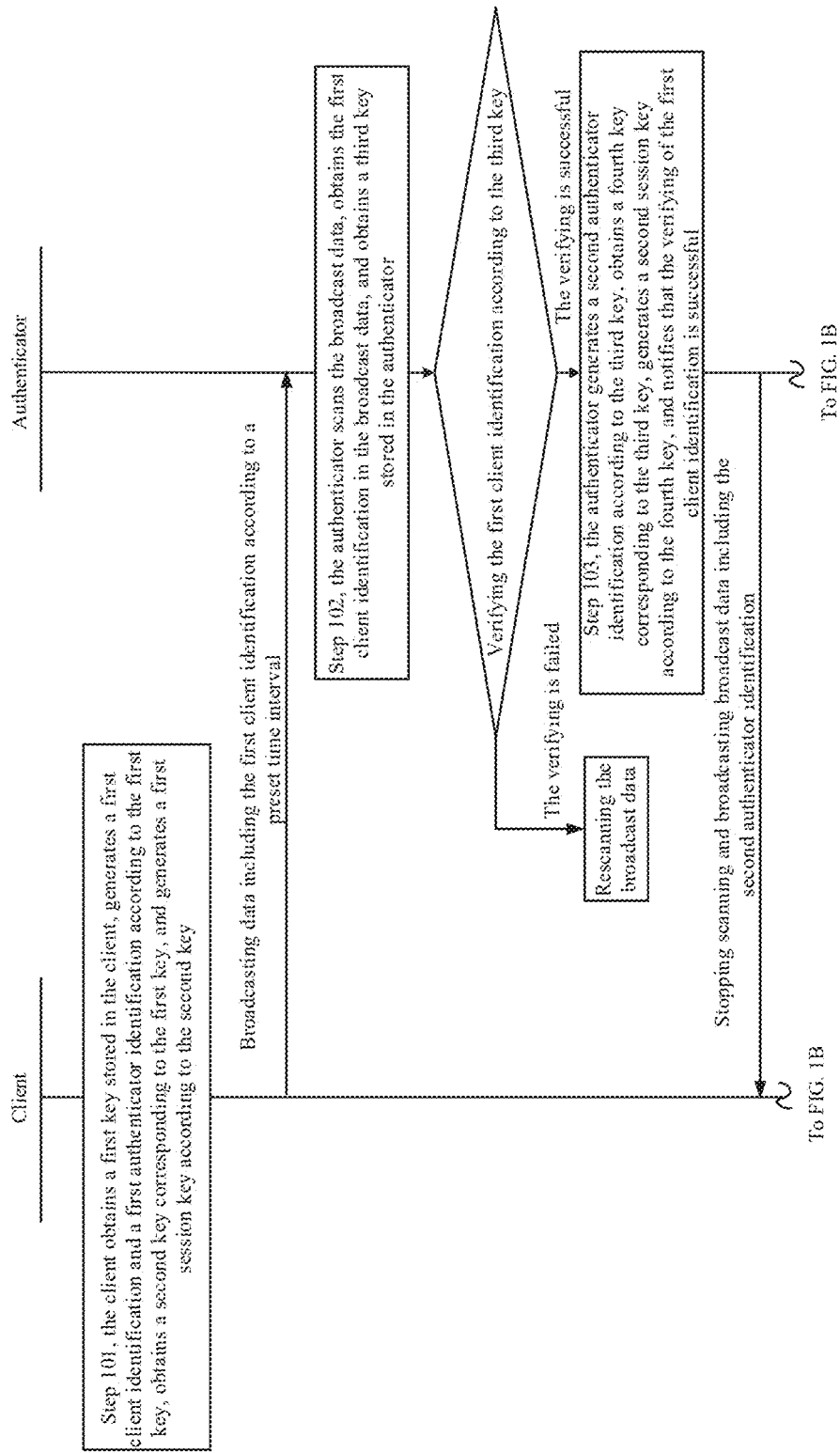
Figure 1B:
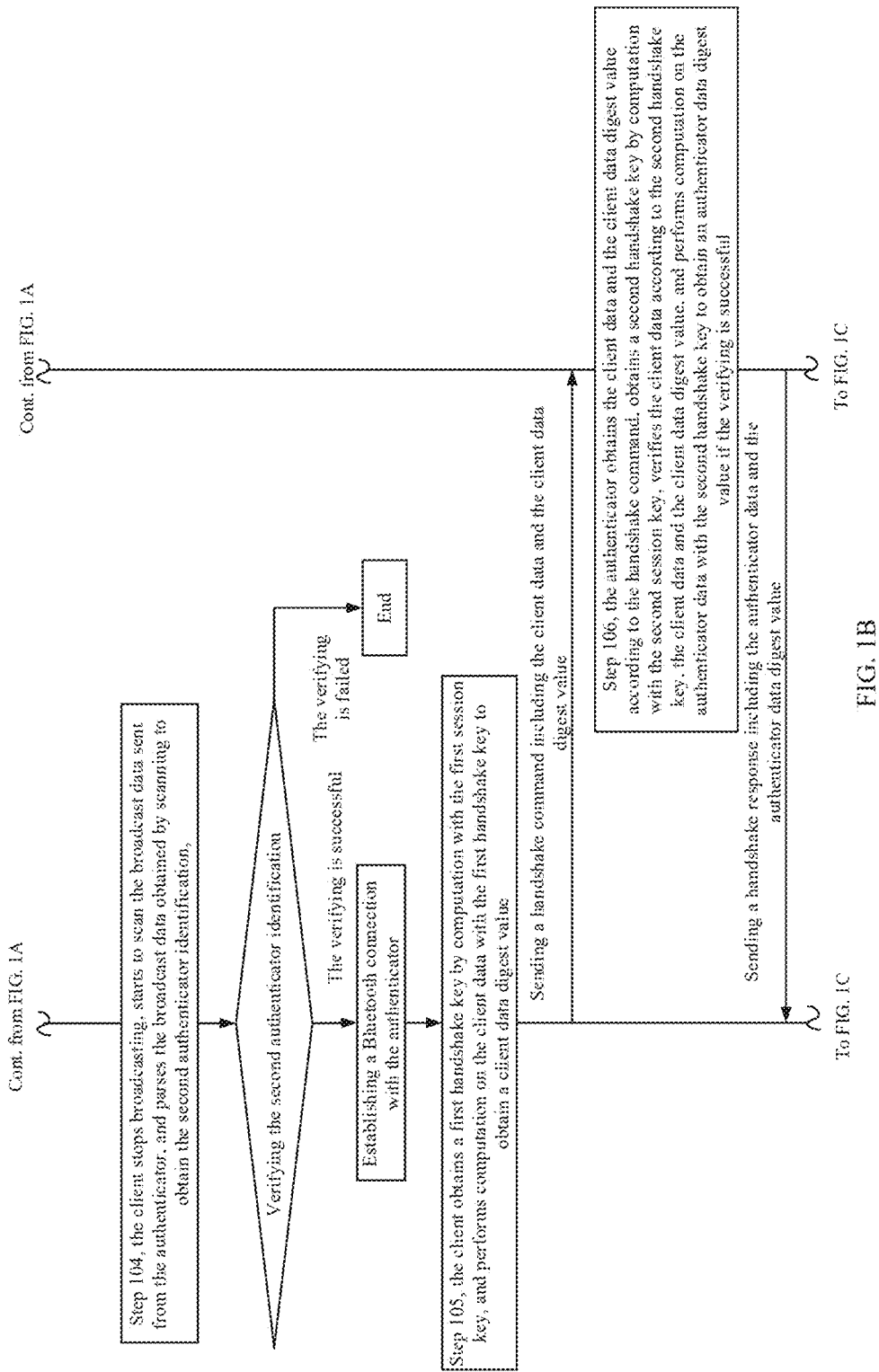

As shown by FIGS. 1A-1C, the method includes:

Step 101, the client obtains a first key stored in the client, generates a first client identification and a first authenticator identification according to the first key, obtains a second key corresponding to the first key, generates a first session key according to the second key, and broadcasts data including the first client identification according to a preset time interval:

Step 102, the authenticator scans the broadcast data, obtains the first client identification in the broadcast data, obtains a third key stored in the authenticator, verifies the first client identification according to the third key, executes Step 103 if the verifying is successful; rescans the broadcast data if the verifying is failed:

Step 103, the authenticator generates a second authenticator identification according to the third key, obtains a fourth key corresponding to the third key, generates a second session key according to the fourth key, notifies that the verifying of the first client identification is successful, and stops scanning and broadcasts broadcast data including the second authenticator identification:

Step 104, the client stops broadcasting, starts to scan the broadcast data sent from the authenticator, parses the broadcast data obtained by scanning to obtain the second authenticator identification, and verifies the second authenticator identification, establishes a Bluetooth connection with the authenticator and execute Step 105 if the verifying is successful, ends the if the verifying is failed:

Step 105, the client obtains a first handshake key by computation with the first session key, performs computation on the client data with the first handshake key to obtain a client data digest value, and sends a handshake command including the client data and the client data digest value to the authenticator:

Step 106, the authenticator obtains the client data and the client data digest value according to the handshake command, obtains a second handshake key by computation with the second session key, verifies the client data according to the second handshake key, the client data and the client data digest value, performs computation on the authenticator data with the second handshake key to obtain an authenticator data digest value if the verifying is successful, and sends a handshake response including the authenticator data and the authenticator data digest value to the client:

Step 107, the client obtains the authenticator data and the authenticator data digest value according to the handshake response, and verifies the authenticator data according to the first handshake key, the authenticator data and the authenticator digest value, executes Step 108 in case of a successful handshake if the verifying is successful: otherwise, performs disconnection;

Step 108, the client obtains a first encryption key by computation with the first session key, performs computation on operating data with the first encryption key to obtain encryption data, and sends an operating command including the encryption data to the authenticator; and Step 109, the authenticator obtains the encryption data in the operating command, obtains a second encryption key by computation with the second session key, decrypts the encryption data with the second encryption key to obtain the operating data, performs corresponding operation according to the operating data to obtain operating result data, performs computation on the operating result data with the second encryption key to obtain operating response data, and sends an operating response including the operating response data to the client.

In an implementation, before Step 101, the method further includes:

Step a1, the client generates a client key pair, sends an extension register command to the authenticator, where the extension register command includes a client version number and a client public key in the client key pair:

Step a2, the authenticator obtains the client public key and the client version number in the extension register command, generates an authenticator key pair, and generates a second parameter according to the client public key and an authenticator private key in the authenticator key pair:

Step a3, the authenticator obtains first preset data stored in the authenticator, generates a second initial pairing key according to the client public key, the authenticator public key of the authenticator key pair, the client version number, the first preset data and the second parameter, splits the second initial paring key to obtain a third key and a fourth key, and stores the third key and the fourth key correspondingly:

Step a4, the authenticator sends an extension register response to the client, where the extension register response includes the authenticator public key and the client version number:

Step a5, the client obtains the authenticator public key and the client version number in the extension register response, and generates a first parameter according to a client private key of the client key pair and the authenticator public key; and Step a6, the client obtains first preset data stored in the client, generates a first initial paring key according to the client public key, the authenticator public key, the client version number, the first preset data and the first parameter, splits the first initial paring key to obtain a first key and a second key, and stores the first key and the second key correspondingly.

In an implementation, before Step a1, a mobile terminal establishes a Bluetooth connection with the authenticator.

After Step a6, the method further includes: disconnecting the Bluetooth connection.

In an implementation, the generating the first client identification and the first authenticator identification according to the first key specifically is: the client generating a first random number with a preset length, obtaining a first preset field stored and a second preset field stored, generating a first client identification according to the first random number, the first preset field and the first key, and generating a first authenticator identification according to the first client identification, the second preset field and the first key.

In an implementation, the generating the first client identification according to the first random number, the first preset field and the first key specifically is: the client concatenating the first preset field and the first random number in sequence, performing computation on the first preset field and the first random number with the first key according to a fourth preset algorithm to obtain first data, and concatenating the first random number and the first data to obtain a first client identification.

In an implementation, the generating the first authenticator identification according to the first client identification, the second preset field and the first key specifically is: the client concatenating the first client identification and the second preset field in sequence, performing computation on the first client identification and the second preset field with the first key according to a fourth algorithm to obtain third data, and obtaining a preset byte in the third data and taking the preset byte as a first authenticator identification.

In an implementation, the generating a first session key according to the second key specifically is: the client obtaining first preset data stored in the client, and performing computation on the first random number and the first preset data with the second key according to a third preset algorithm to obtain a first session key.

In an implementation, the verifying the first client identification according to a third key specifically is: the authenticator obtaining a first preset field stored in the authenticator, a first random number and first data in the first client identification, performing computation on the first preset field and the first random number with the third key according to a fourth preset algorithm to obtain second data, determining whether the second data is identical to the first data, if yes, the verifying is successful, otherwise, the verifying is failed.

In an implementation, the generating the second authenticator identification according to the third key by the authenticator specifically is: the authenticator obtaining a second preset field stored in the authenticator, concatenating the first client identification and the second preset field in sequence, performing computation on the first client identification and the second preset field with the third key according to a fourth preset algorithm to obtain fourth data, and obtaining a preset byte in the fourth data and taking the preset byte as the second authenticator identification.

In an implementation, the generating the second session key according to the fourth key specifically is: the authenticator obtaining first preset data stored in the authenticator, and performing computation on the first random number and the first preset data with the fourth key according to a third preset algorithm to obtain a second session key.

In an implementation, the verifying the second authenticator identification specifically is: the client comparing the second authenticator identification with the first authenticator identification, where the verifying is successful if there is consistent comparison, otherwise, the verifying is failed.

In an implementation, the obtaining the first handshake key by computation with the first session key specifically is: the client obtaining a second random number and second preset data stored in the client, and performing computation on the second random number and the second preset data with the first session key according to a third preset algorithm to obtain the first handshake key.

In an implementation, the obtaining the second handshake key by computation with the second session key by the authenticator specifically is: the authenticator obtaining a fourth random number and second preset data stored in the authenticator, and performing computation on the fourth random number and the second preset data with the second session key according to a third preset algorithm to obtain the second handshake key.

In an implementation, in Step 103, the notifying that the verifying of the first client identification is successful, and stopping scanning and broadcasting the broadcast data including the second authenticator identification specifically includes: the authenticator establishing the Bluetooth connection with the client, and broadcasting the broadcast data including the second authenticator identification when the Bluetooth connection is disconnected.

In an implementation, after the authenticator establishes the Bluetooth connection with the client, the method further includes: the authenticator sends a first unique identification address to the client, and receives a second unique identification address sent from the client.

The broadcast data further includes the first unique identification address and the second unique identification address.

Specifically, Step 104 specifically includes: the client stopping broadcasting and starting to scan the broadcast data including the first unique identification address and the second unique identification address, parsing the broadcast data obtained by scanning to obtain the second authenticator identification, and verifying the second authenticator identification, establishing the Bluetooth connection with the authenticator and executing Step 105 if the verifying is successful, ending the procedure if the verifying is failed.

In an implementation, in Step 103, the notifying that the verifying of the first client identification is successful specifically is: the authenticator prompting a user to switch a broadcast state of the client to a scanning state via a prompting module.

Embodiment 2

Embodiment 2 provides a method for communicating with an authenticator, which is applied to a system including a client and an authenticator, the client is an application installed in a mobile terminal with Bluetooth function. The method specifically includes a session phase, a handshake phase and a communication encryption phase.

The present embodiment is a specific process of the client communicating with the authenticator for the first time. The session phase includes three phases: pairing key establishment, session data establishment and session discovery.

Figure 2A:
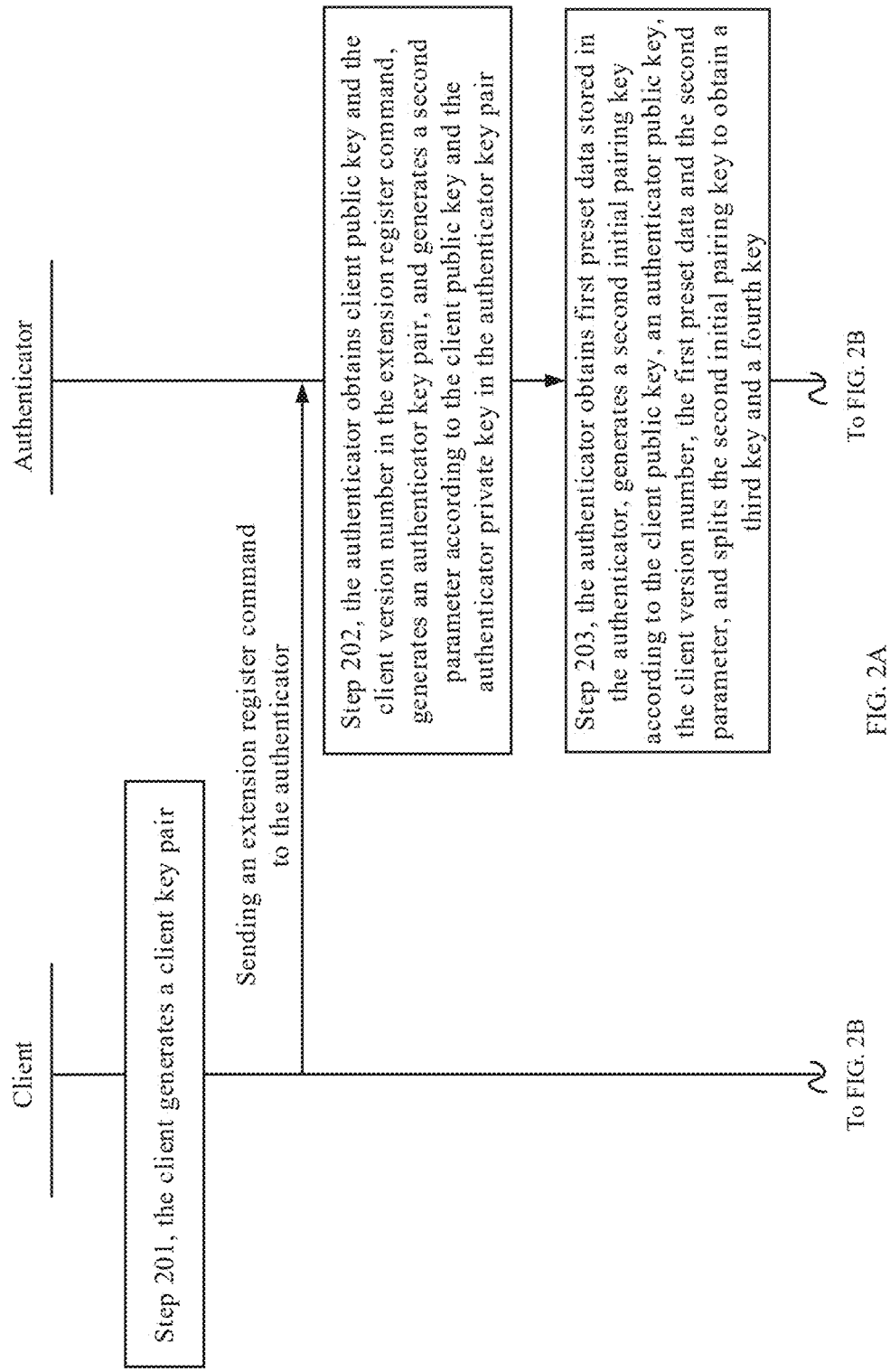
FIGS. 2A-2B are flow charts of a method for establishing a pairing key of a session phase in a method for communicating provided by Embodiment 2 of the present disclosure.
Figure 2B:
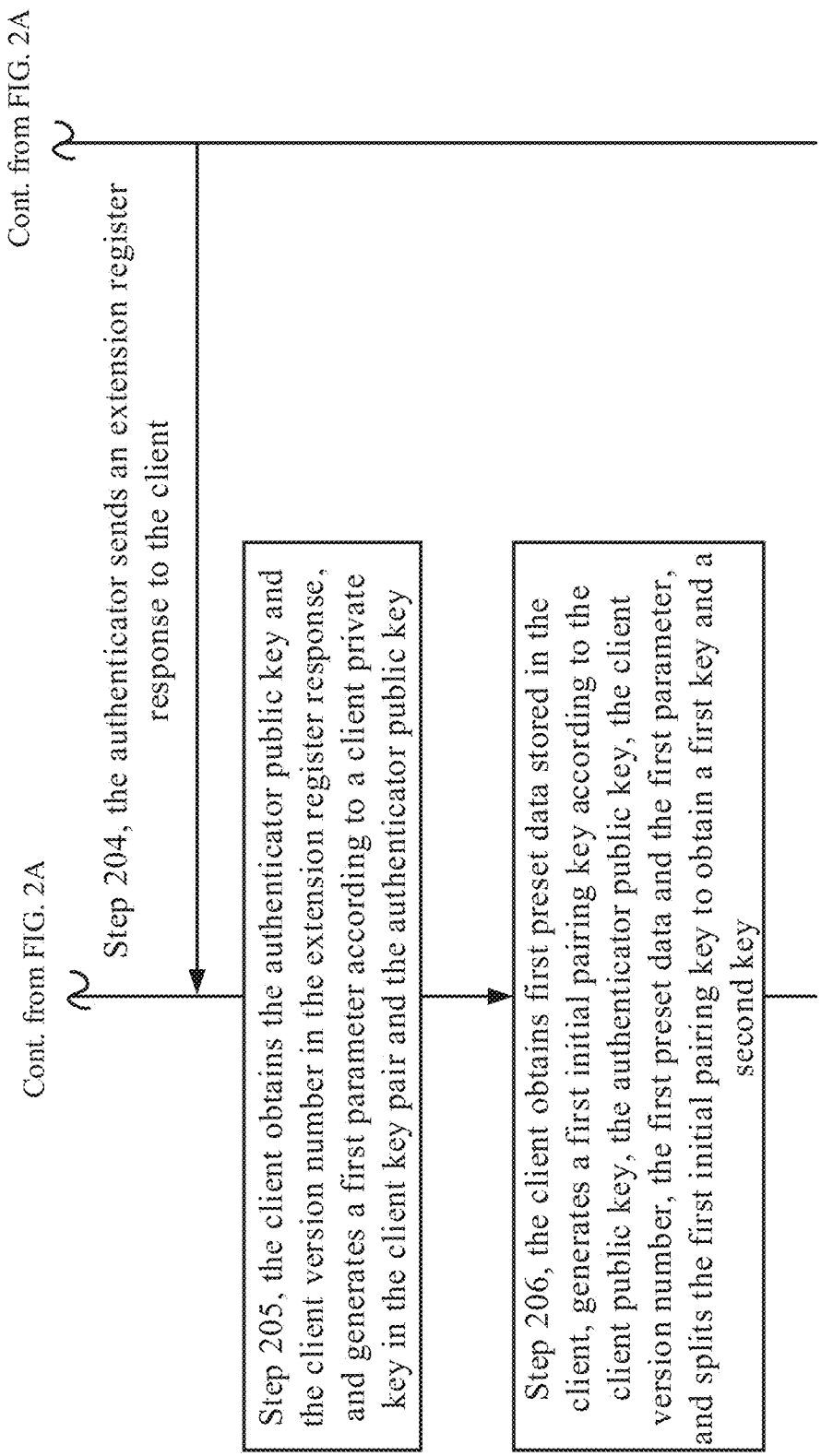

Specifically, as shown by FIGS. 2A-2B, the paring key establishing process in the session phase includes the following steps.

Step 201, the client generates a client key pair, and sends an extension register command to the authenticator, where the extension register command includes client version number and client public key in the client key pair;

In the present embodiment, the client generates client key pair specifically is: the client generating client key pair according to a first preset algorithm. The client key pair generated by the client includes client public key and client private key.

For example, the client public key generated by the client is:

5F164D70138A35F67FAAEF38E7D4A8C9249A6C88
30A4A46C9844B617E9AD15AD3E2BC019CB398
4A24AB2173033C9615FBD58542739957227510060CA97F1A2E7.

The client private key generated by the client is:

B3CE8A2AAD3E11CA5E170D2DA0F3F098EE7C70041100976385AB0 FB4C95F8CE7.

The first preset algorithm is an algorithm for generating the key pair.

For example, the first preset algorithm is: Elliptic Curve Domain Parameters over Fp (secp256r1) (ECC-256).

For example, the extension register command sent to the authenticator specifically is:

```
dictionary CableRegistrationData {
required sequence<long> versions; required BufferSource rpPublicKey;
}.
```

The client version number is: "00000001".

In the present embodiment, before Step 201, the mobile terminal where the client resides establishes the Bluetooth connection with the authenticator, and the authenticator is powered up and broadcast before the Bluetooth connection is established.

In an implementation, the mobile terminal where the client resides establishing the Bluetooth connection with the authenticator specifically is: the mobile terminal where the client resides scanning for a Bluetooth device, when the mobile terminal determining that the Bluetooth device required to be connected is the authenticator, the mobile terminal performing the Bluetooth connection with the authenticator.

In an implementation, both the mobile terminal where the client resides and the authenticator are Bluetooth devices, if the data broadcast by the authenticator declares that no accessing permission is required, the mobile terminal where the client resides can send data for communicating directly.

The data broadcast by the authenticator declaring that no accessing permission is required represents that a communication mode of the authenticator is an open mode.

In the present embodiment, the extension register command sent to the authenticator by the server via the client is data conformed to the standard Bluetooth protocol, specifically, the extension register command is sent via a transmission layer of the Bluetooth connection established between the mobile terminal where the client resides and the authenticator.

Step 202, the authenticator obtains client public key and the client version number in the extension register command, generates an authenticator key pair, and generates a second parameter according to the client public key and the authenticator private key in the authenticator key pair.

In the present embodiment, the authenticator generating the authenticator key pair specifically is: the authenticator generating an authenticator key pair according to a first preset algorithm, where the authenticator key pair specifically includes an authenticator private key and an authenticator public key.

The first preset algorithm specifically is an algorithm for generating the key pair, where the authenticator and the client use the same algorithm to generate the key pair.

For example, the first preset algorithm is: ECC-256.
The authenticator public key is:
CCF146DD3FF87173845A576973664EB2BB80861 CA10A656ADC526 B4075FA06EE52B4A7C65B1-2CA572441D2354B08E8172BC296925ADEF8E89-8B CD5FA1189467B.

The authenticator private key is:
4C5CD1D426794EB72CBE05D83B9799E48161D-7FBFDE4D6B2FFB76 A9662C5CFC5.

The generating the second parameter according to the client public key and the authenticator private key in the authenticator key pair specifically is: generating the second parameter according to the client public key and the authenticator private key in the authenticator key pair according to a second preset algorithm.

Specifically, the second preset algorithm specifically is Elliptic Curve Diffie-Hellman (ECDH) algorithm.

Further, the generating the second parameter according to the client public key and the authenticator private key in the authenticator key pair according to the second preset algorithm specifically is: the authenticator performing multiply operation on the authenticator private key and the client public key to obtain a product result, and taking the first 32 bytes in the product result as the second parameter.

For example, the authenticator performs multiply operation on the authenticator private key and the client public key to obtain a product result which is:
8BD9B24EE678018E1CC6C487A55FF3774765F8A-B2AF43BDD101F03E172181D1718D86A26245A9-808CA09E3048497939D1F314825660DCB14DB-EF1° F.0F6EE619B9.

The second parameter is:
8BD9B24EE678018E1CC6C487A55FF3774765F8A-B2AF43BDD101F03 E172181D17.

Step 203, the authenticator obtains first preset data stored in the authenticator, generates a second initial pairing key according to the client public key, an authenticator public key, the client version number, the first preset data and the second parameter, and splits the second initial pairing key to obtain a third key and a fourth key.

In the present embodiment, the authenticator generating the second initial pairing key according to the client public key, the authenticator public key, the client version number, the first preset data and the second parameter specifically is: the authenticator generating the second initial pairing key according to a third preset algorithm based on the client public key, the authenticator public key, the client version number, the first preset data and the second parameter.

The authenticator generating the second initial pairing key according to the third preset algorithm based on the client public key, the authenticator key, the client version number, the first preset data and the second parameter specifically is: the authenticator concatenating the client version number, the client public key and the authenticator public key in sequence and performing hash digest computation to obtain a salt value, taking the second parameter as a key to perform computation on the salt value and the first preset data according to the third preset algorithm to obtain the second initial pairing key.

In the present embodiment, the length of the obtained second initial pairing key is 32 bytes, the first 16 bytes of the second initial paring key is taken as the third key and the last 16 bytes of the second initial pairing key is taken as the fourth key.

In the present embodiment, the method further includes: the authenticator stores the third key and the fourth key correspondingly into a second initial pairing key list.

For example, the first preset data is American Standard Code for Information Interchange (ASCII) character string: "Fast Identity Online (FIDO) ca-Bluetooth Low Energy (BLE) v1 pairing data".

The third preset algorithm is: Hash-based Message Authentication Code-based Key Derivation Function-Secure Hash Algorithm-256-bit (HKDF-SHA-256).

The authenticator concatenates the client version number, the client public key and the authenticator public key in sequence as the following:
000000015F164D70138A35F67FAAEF38E7D4A8C-9249A6C8830A4A4 6C9844B617E9AD15AD3E 2B-C0 19CB3984A24AB2173033C9615FBD5854273995 7227510060CA97F1A2E7CCF146DD3FF87173845 A576973664EB2BB80861CA10 A656ADC526B-4075FA06EE52B4A7C65B12CA572441D2354B0-8E8172BC296925 ADEF8E898BCD5FA1189467B.

The second initial pairing key obtained by taking the second parameter as the key and performs computation on the salt value and the first preset data according to the third preset algorithm is:
8BD9B24EE678018E1CC6C487A55FF3774765F8A-B2AF43BDD101F03 E172181D17.

The third key obtained by splitting the second initial pairing key is:
039A77D14CD5077E9DEA7C5B344E1CB35A5043-3540E55792A2D64 BE31571E883.

The fourth key obtained by splitting the second initial pairing key is:
B66209F7436B16AD3CA177970A266E89A3964B-4DEFC9FB9A15665C C1C6C31087.

Step 204, the authenticator sends an extension register response to the client, where the extension register response includes the authenticator public key and the client version number.

In the preset embodiment, the extension register response sent to the client specifically is:

```
CableRegistration = {
    version: int,
    max Version: int,
    authenticatorPublicKey: bytes,
}.
```

Step 205, the client obtains the authenticator public key and the client version number in the extension register response, and generates a first parameter according to a client private key in the client key pair and the authenticator public key.

In the present embodiment, the generating the first parameter according to the client private key in the client key pair and the authenticator public key specifically is: generating the first parameter according to the second preset algorithm based on the client private key in the client key pair and the authenticator public key.

Specifically, the generating the first parameter according to the second preset algorithm based on the client private key in the client key pair and the authenticator public key specifically is: the client multiplying the client private key with the authenticator public key to obtain a product result, and taking the first 32 bytes of the product result as a first parameter.

The second preset algorithm specifically is ECDH algorithm.

For example, the product result obtained by the client multiplying the client private key with the authenticator public key is:
8BD9B24EE678018E1CC6C487A55FF3774765F8AB-2AF43BDD101F03 E172181D1718D86A2624-5A9808CA09E3048497939D1F314825660DCB14D-BEF1° F.0F6EE619B9.

The first parameter is:
8BD9B24EE678018E1CC6C487A55FF3774765F8A-B2AF43BDD101F03 E172181D17.

Step 206, the client obtains first preset data stored in the client, generates a first initial pairing key according to the client public key, the authenticator public key, the client version number, the first preset data and the first parameter, and splits the first initial pairing key to obtain a first key and a second key.

In the present embodiment, the generating the first initial pairing key according to the client public key, the authenticator public key, the client version number, the first preset data and the first parameter specifically is: generating the first initial pairing key according to third preset algorithm based on the client public key, the authenticator public key, the client version number, the first preset data, and the first parameter.

Specifically, the client generating the first initial pairing key according to third preset algorithm based on the client public key, the authenticator public key, the client version number, the first preset data, and the first parameter specifically is: the client concatenating the version number, the client public key and the authenticator public key in sequence and performing hash digest computation to obtain a salt value, taking the first parameter as a key to perform computation on the salt value and the first preset data to obtain the first initial pairing key.

In the present embodiment, the client stores the first key and the second key correspondingly into a first initial pairing key list.

The length of the obtained first initial pairing key is 32 bytes, the first 16 bytes of the first initial pairing key is the first key, and the last 16 bytes of the first initial pairing key is the second key.

For example, the first preset data is ASCII character string "FIDO caBLE v1 pairing data".

The third preset algorithm is: HKDF-SHA-256.

The first initial pairing key is:
8BD9B24EE678018E1CC6C487A55FF3774765F8-AB2AF43BDD101F03 E172181D17.

The client concatenates the client version number, the client public key and the authenticator public key in sequence as the followings:
000000015F164D70138A35F67FAAEF38E7D4A8C9-249A6C8830A4A4 6C9844B617E9AD15AD3E-2BC019CB3984A24AB2173033C9615FBD58542-73995 7227510060CA97F1A2E7CCF146DD3FF871-73845A576973664EB2BB80861CA10 A656ADC-526B4075FA06EE52B4A7C65B12CA572441D23-54B08E8172BC296925ADEF8E898BCD5 FA11894-67B.

The first initial pairing key is:
8BD9B24EE678018E1CC6C487A55FF3774765F8A-B2AF43BDD101F03 E172181D17.

The first key is:
039A77D14CD5077E9DEA7C5B344E1CB35A5043-3540E55792A2D64 BE31571E883.

The second key is:
B66209F7436B16AD3CA177970A266E89A3964B4D-EFC9FB9A15665C C1C6C31087.

Figure 3A:
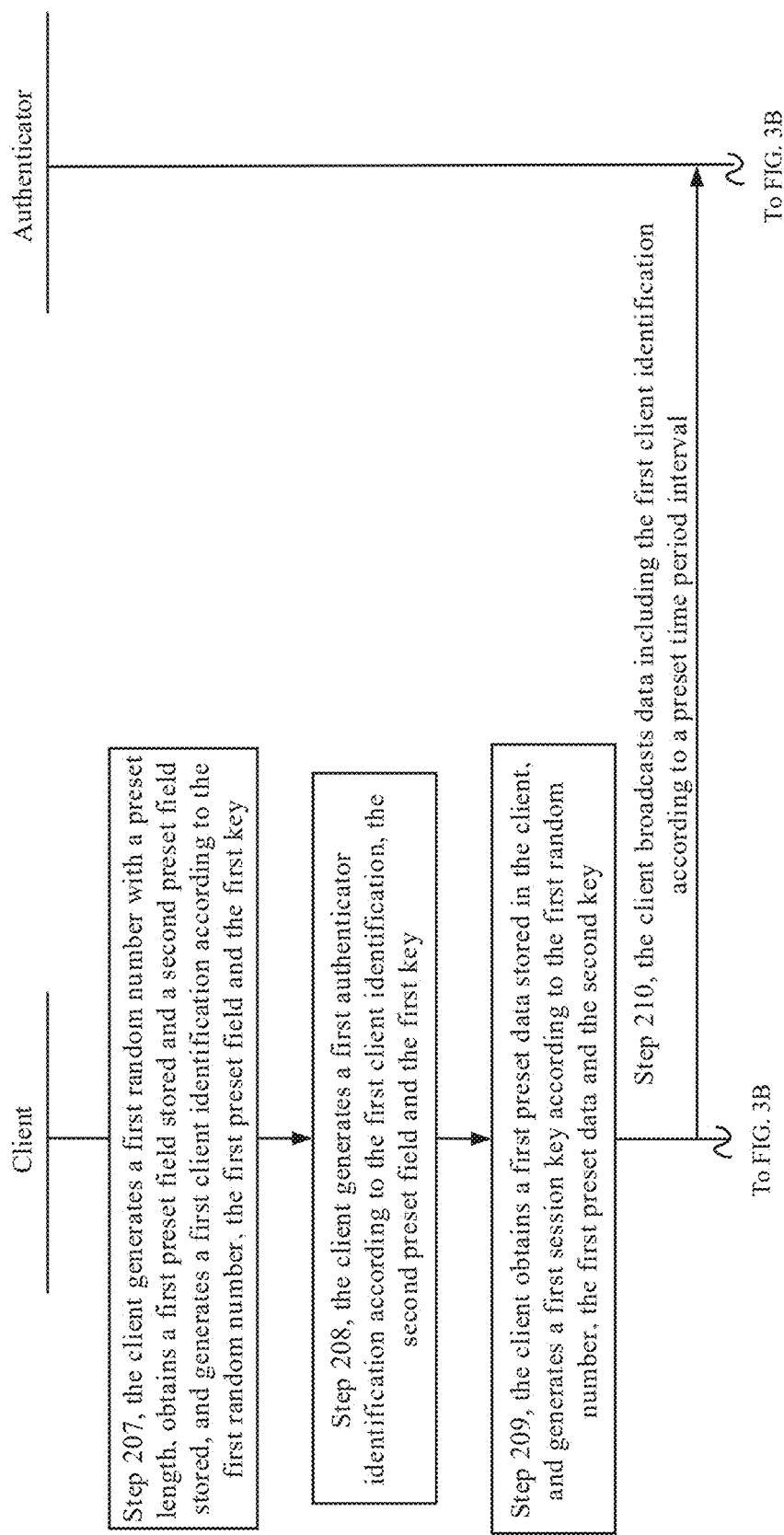
FIGS. 3A-3C are flow charts of a method for establishing session data and session discovery of the session phase in the method for communicating provided by Embodiment 2 of the present disclosure.
Figure 3B:
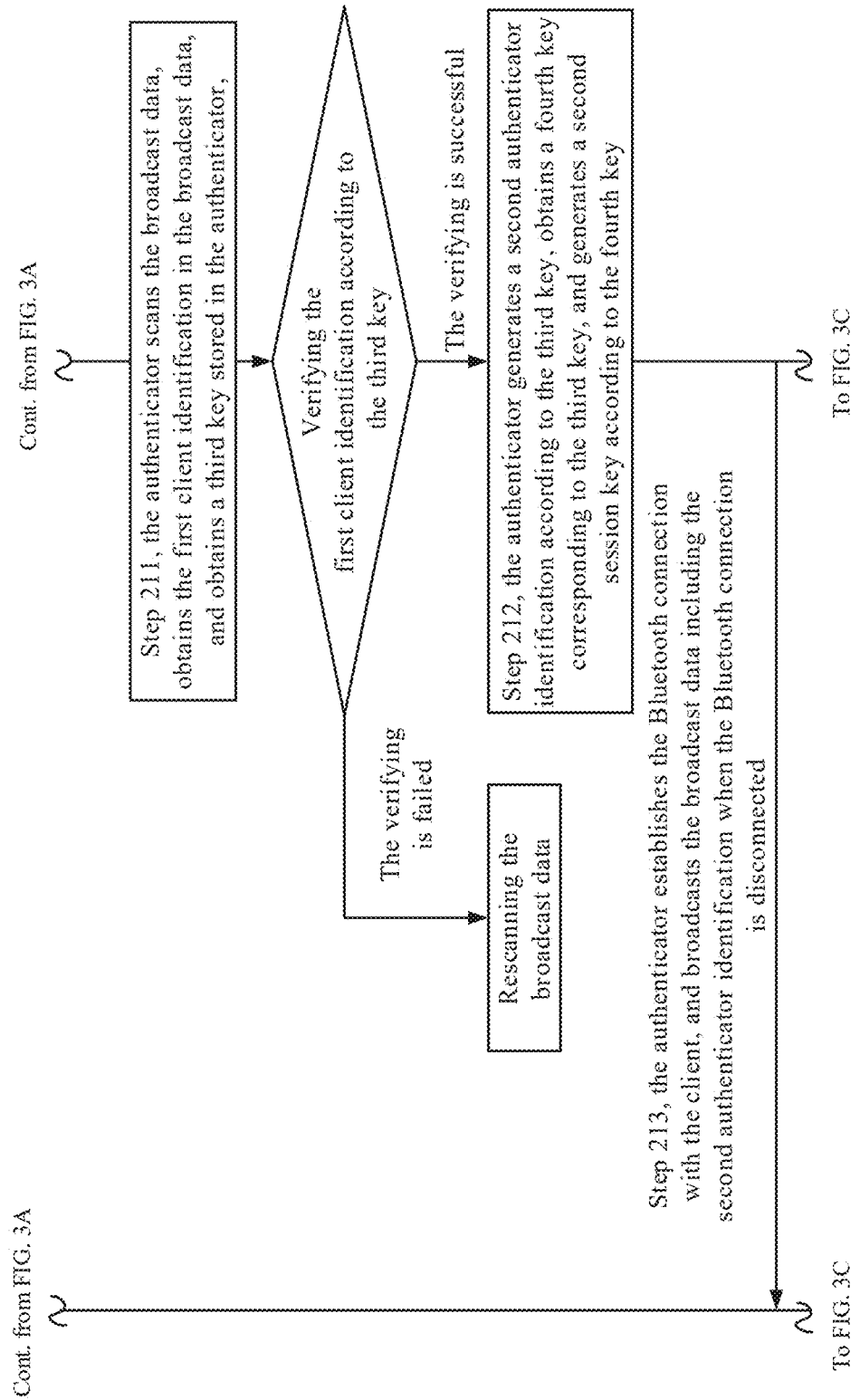
Figure 3C:
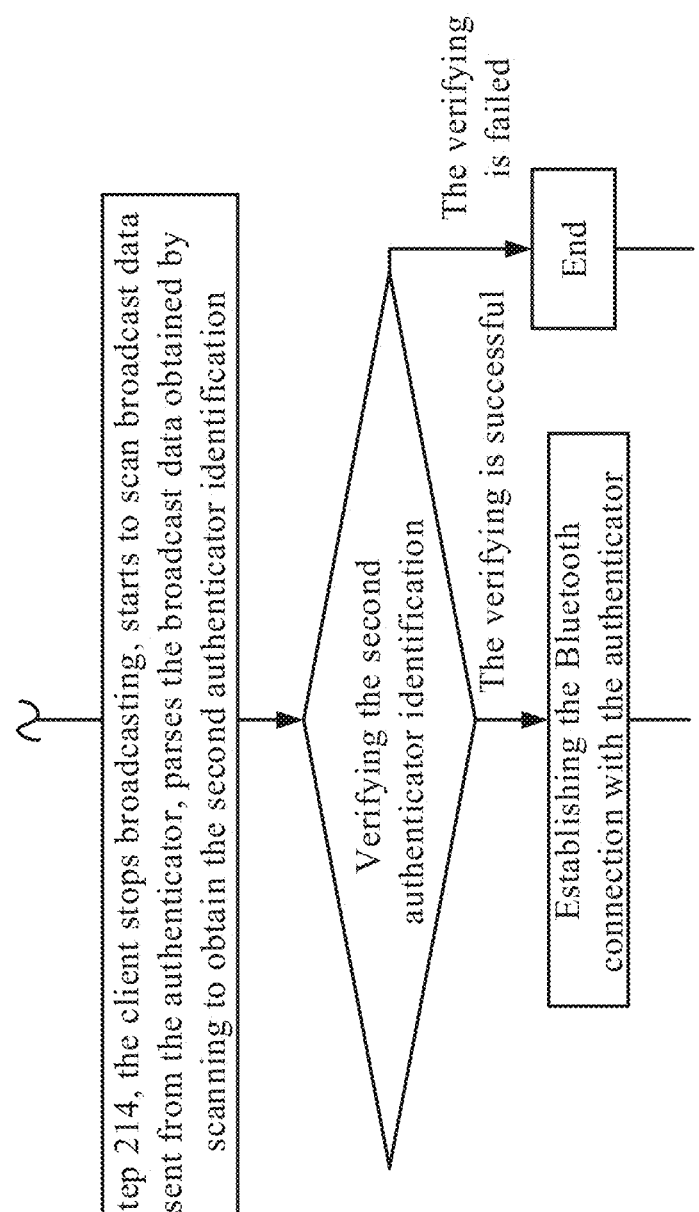

Specifically, as shown in FIGS. 3A-3C, the session data establishment process and the session discovery process in the session phase includes the following steps.

Step 207, the client generates a first random number with a preset length, obtains a first preset field stored and a second preset field stored, and generates a first client identification according to the first random number, the first preset field and the first key.

In the present embodiment, the generating the first client identification according to the first random number, the first preset field and the first key specifically is: the client concatenating the first preset field and the first random number in sequence, performing computation on the first preset field and the first random number with the first key according to a fourth preset algorithm to obtain first data, and concatenating the first random number and the first data as the first client identification.

The preset length of the first random number generated by the client is 8 bytes: for example, the first random number is: EB59387103AF03A5.

The first preset field is: "client".

The second preset field is: "authenticator".

The fourth preset algorithm specifically is: Hash-based Message Authentication Code-based-Secure Hash Algorithm 256-bit (HMAC-SHA256).

The first data obtained by computing is 8 bytes.

The first data obtained by performing computation on the first preset field and the first random number with the first key according to the fourth preset algorithm is: 46D62B1364719F61.

The first client identification clientEid obtained by concatenating the first random number and the first data is: EB59387103AF03A546D62B1364719F61.

Step 208, the client generates a first authenticator identification according to the first client identification, the second preset field and the first key.

In the present embodiment, Step 208 specifically is: the client concatenating the first client identification and the second preset field in sequence, performing computation on the first client identification and the second preset field with the first key according to the fourth preset algorithm to obtain third data, and obtaining the first 16 bytes of the third data as the first authenticator identification.

For example, the second preset field is: "authenticator".

The third data is: 4C7202F777505528DDF467D11BA1CC5F.

The first authenticator identification authenticatorEid is:
4C7202F777505528DDF467D11BA1CC5F.

Step 209, the client obtains a first preset data stored in the client, and generates a first session key according to the first random number, the first preset data and the second key.

In the preset embodiment, Step 209 specifically is: the client performing computation on the first random number and the first preset data with the second key according to a third preset algorithm to obtain the first session key.

The third preset algorithm is: HKDF-SHA-256.

The first preset data is ASCII character string "FIDO caBLE v1 pairing data".

The first session key sessionPreKey is:
E93BCD54F6726C30DE871348C44C0D8572679690-0F8A2C035DF6CE 7C11F4498E.

Step 210, the client broadcasts data including the first client identification according to a preset time period interval.

In the present embodiment, the client broadcasts data according to a preset broadcast format, specifically, the first client identification is stored in a data item of the broadcast data, specifically, stored in the Service Data item.

Step 211, the authenticator scans the broadcast data, obtains the first client identification in the broadcast data, obtains a third key stored in the authenticator, and verifies the first client identification according to the third key, executes Step 212 if the verifying is successful, rescans the broadcast data if the verifying is failed.

In the present embodiment, after the authenticator sends the extension register response, the method further includes: the authenticator starts to scan.

In the present embodiment, the verifying the first client identification according to the third key specifically is: the authenticator obtaining a first preset field stored in the authenticator, the first random number and the first data in the first client identification, performing computation on the first preset field and the first random number with the third key according to the fourth algorithm to obtain second data, and determining whether the second data is identical to the first data, if yes, the verifying is successful, otherwise, the verifying is failed.

Specifically, the verifying the first client identification according to the third key specifically is: the authenticator taking the first 8 bytes of the first client identification as the first random number and taking the last 8 bytes of the first client as the first data, performing computation on the first preset field and the first random number with the third key according to the fourth preset algorithm to obtain the second data, and determining whether the second data is identical to the first data, if yes, the verifying is successful, otherwise, the verifying is failed.

Step 212, the authenticator generates a second authenticator identification according to the third key, obtains a fourth key corresponding to the third key, and generates a second session key according to the fourth key.

In an implementation, the authenticator generating the second authenticator identification according to the third key specifically is: the authenticator obtaining a second preset field stored in the authenticator, concatenates the first client identification and the second preset field in sequence, performing computation on the first client identification and the second preset field with the third key according to the fourth preset algorithm to obtain fourth data, and taking a preset byte in the fourth data as the authenticator identification.

In the present embodiment, specifically, the preset byte is the first 16 bytes.

In an implementation, the generating the second session key according to the fourth key specifically is: the authenticator obtaining first preset data stored in the authenticator, and performing computation on the first random number and the first preset data with the fourth key according to the third preset algorithm to obtain the second session key.

For example, the second authenticator identification authenticatorEid is:
4C7202F777505528DDF467D11BA1CC5F.

The second session key sessionPreKey is:
E93BCD54F6726C30DE871348C44C0D857267969-00F8A2C035DF6CE 7C11F4498E.

Step 213, the authenticator establishes the Bluetooth connection with the client, and broadcasts the broadcast data including the second authenticator identification when the Bluetooth connection is disconnected.

In the present embodiment, the authenticator broadcasts data according to a preset broadcast format, specifically, the second authenticator identification is stored in a data item of the broadcast data, specifically, stored in Service Data item.

In an implementation, the authenticator establishing the Bluetooth connection with the client specifically is: the authenticator sending a Bluetooth connection establishing request to the client.

Further, after the authenticator establishes the Bluetooth connection with the client, the method further includes: the authenticator waits for receiving a response for disconnecting the Bluetooth connection from the client.

Further, after the authenticator establishes the Bluetooth connection with the client, the method further includes: the authenticator sends a Bluetooth connection disconnecting request to the client.

In an implementation, after the authenticator establishes the Bluetooth connection with the client, the method further includes: the authenticator sends a first unique identification address to the client, and receives a second unique identification address sent from the client.

In an implementation, the broadcast data broadcast by the authenticator further includes the first unique identification address and the second unique identification address.

Step 214, the client stops broadcasting, starts to scan broadcast data sent from the authenticator, parses the broadcast data obtained by scanning to obtain the second authenticator identification, and verifies the second authenticator identification, establishes the Bluetooth connection with the authenticator if the verifying is successful, ends the procedure if the verifying is failed.

In an implementation, Step 214 specifically includes: the client stopping the broadcasting, starting to scan the broadcast data including the first unique identification address and the second unique identification address, parsing the broadcast data obtained by scanning to obtain the second authenticator identification, and verifying the second authenticator identification, establishing the Bluetooth connection with the authenticator if the verifying is successful, ending the procedure if the verifying is failed.

In the present embodiment, the verifying the second authenticator identification specifically is: the client comparing the second authenticator identification with the first authenticator identification, if they are consistent, the verifying is successful, otherwise, the verifying is failed.

Figure 4A:
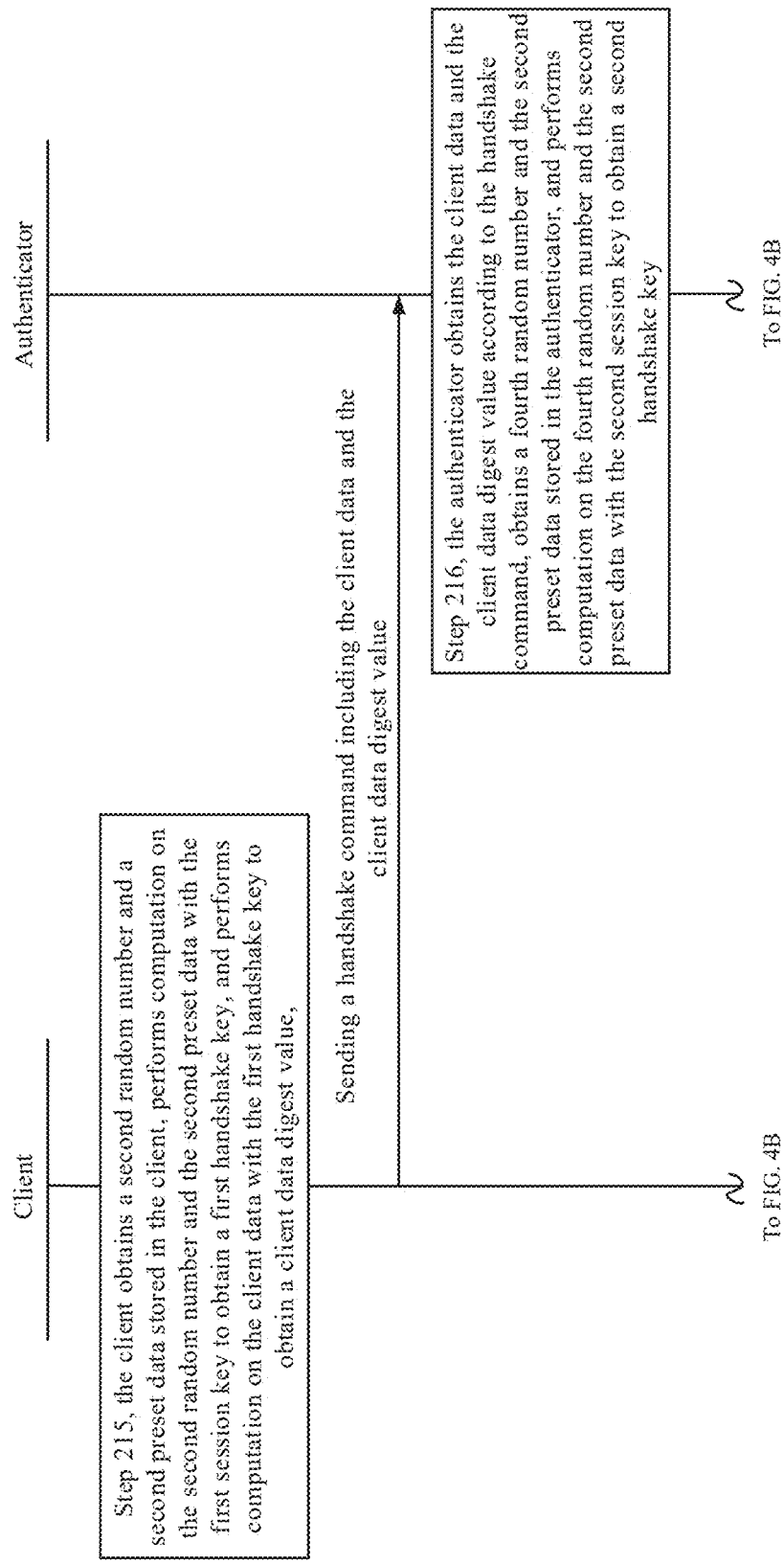
Figure 4B:
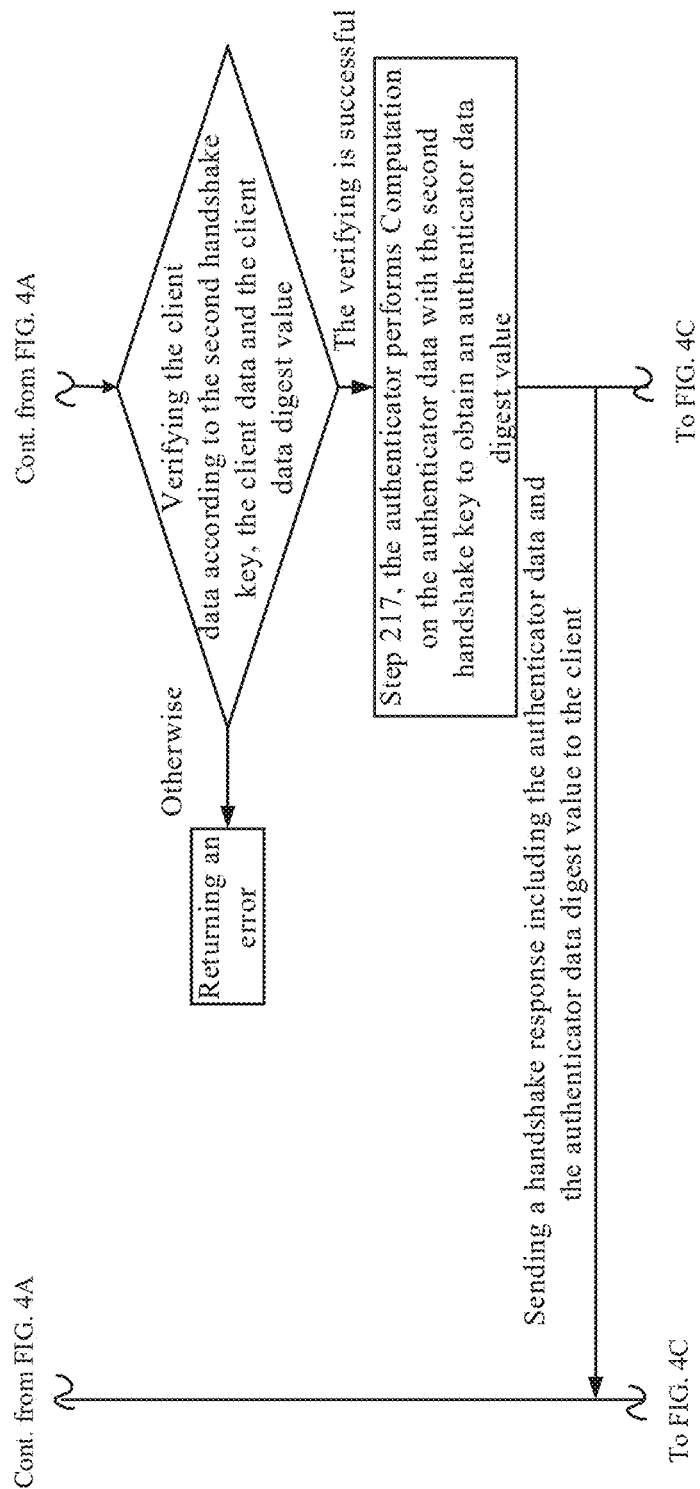

Specifically, as shown by FIGS. 4A-4C, the handshake phase includes the following steps.

Step 215, the client obtains a second random number and a second preset data stored in the client, performs computation on the second random number and the second preset data with the first session key to obtain a first handshake key, performs computation on the client data with the first handshake key to obtain a client data digest value, and sends a handshake command including the client data and the client data digest value to the authenticator.

In the present embodiment, the client obtaining the second random number specifically is: the client taking a first random number of the session phase as the second random number.

The first random number specifically is an 8-byte random number generated by the client during the session phase. The client obtaining the second random number and the second preset data stored in the client specifically is: the client performing computation on the second random number and the second preset data with the first session key according to the third preset algorithm to obtain the first handshake key.

The performing computation on the client data with the first handshake key to obtain the client data digest value specifically is: the client generating a third random number, taking the client preset field and the third random number as the client data, and performing computation on the client data with the first handshake key according to a fourth preset algorithm to obtain the client data digest value.

Specifically, the client data includes: a client preset field and a 16-byte third random number generated by the client.

For example, the second preset data is ASCII character string "FIDO caBLE v1 handshakeKey".

The obtained first handshake key is:
31454C6E1BB6A9D64790C9B1FD1372F85F5DC-09072B398317FF0760 EACE009A5.

The third random number is: A7F65B4E7E13B17-ACFFD14103B9B13C9.

The client preset field is: 6361424C457631636C6-9656E7468656C6C6F.

The client data is:
6361424C457631636C69656E7468656C6C6FA7F6-5B4E7E13B17ACFF D14103B9B13C9.

The client digest value is: A7F57B13C10EE624-F3B40E3F7B073567.

Step 216, the authenticator obtains the client data and the client data digest value according to the handshake command, obtains a fourth random number and the second preset data stored in the authenticator, performs computation on the fourth random number and the second preset data with the second session key to obtain a second handshake key, and verifies the client data according to the second handshake key, the client data and the client data digest value, executes Step 217 if the verifying is successful, otherwise, returns an error.

In the present embodiment, the client obtaining a fourth random number specifically is: the client taking the first random number of the session phase as the fourth random number.

The first random number specifically is an 8-byte random number generated by the client at the session phase. The authenticator performing computation on the fourth random number and the second preset data with the second session key to obtain the second handshake key specifically is: the authenticator performing computation on the fourth random number and the second preset data with the second session key according to the third preset algorithm to obtain the second handshake key.

Specifically, the verifying the client data with the second handshake key, the client data and the client data digest value specifically is: the authenticator performing computation on the client data with the second handshake key according to the fourth preset algorithm to obtain the client data digest value, and determining whether the client data digest value obtained by performing computation is identical to the client data digest value, if yes, the verifying is successful, otherwise, the verifying is failed.

For example, the second preset data is ASCII character string "FIDO caBLE v1 handshakeKey".

The second handshake key is:
31454C6E1BB6A9D64790C9B1FD1372F85F5DC0-9072B398317FF0760 EACE009A5.

Step 217, the authenticator performs computation on the authenticator data with the second handshake key to obtain an authenticator data digest value, and sends a handshake response including the authenticator data and the authenticator data digest value to the client.

In the present embodiment, the performing computation on the authenticator data with the second handshake key to obtain the authenticator data digest value specifically is: the authenticator generating a fifth random number, taking an authenticator preset field and the fifth random number as the authenticator data, and performing computation on the authenticator data with the second handshake key according to the fourth preset algorithm to obtain the authenticator data digest value.

Specifically, the authenticator data includes: the authenticator preset field and the 16-byte fifth random number generated by the authenticator.

For example, the fifth random number is: 935337A-931634E9C22C8EEB080827DF3.

The authenticator preset field is: 6361424C45763161757468656E74696361746F72686-56C6C6F.

The authenticator data is: 6361424C45763161757468656E74696361746F7268-656C6C6F935337A931634E9C22C8EEB080827DF3.

The authenticator data digest value is: 07808B071-C8E69DF1F1BFD13D52F39B8.

Step 218, the client obtains the authenticator data and the authenticator data digest value according to the handshake response, and verifies the authenticator data according to the first handshake key, the authenticator data and the authenticator data digest value, the handshake is successful if the verifying is successful, otherwise, performs disconnection.

Specifically, the verifying the authenticator data according to the first handshake key, the authenticator data and the authenticator data digest value specifically is: the client performing computation on the authenticator data with the first handshake key according the fourth algorithm to obtain the authenticator data digest value, and determining whether the authenticator data digest value obtained by performing computation and the received authenticator data digest value are identical, if yes, the verifying is successful, otherwise, the verifying is failed.

Figure 5A:
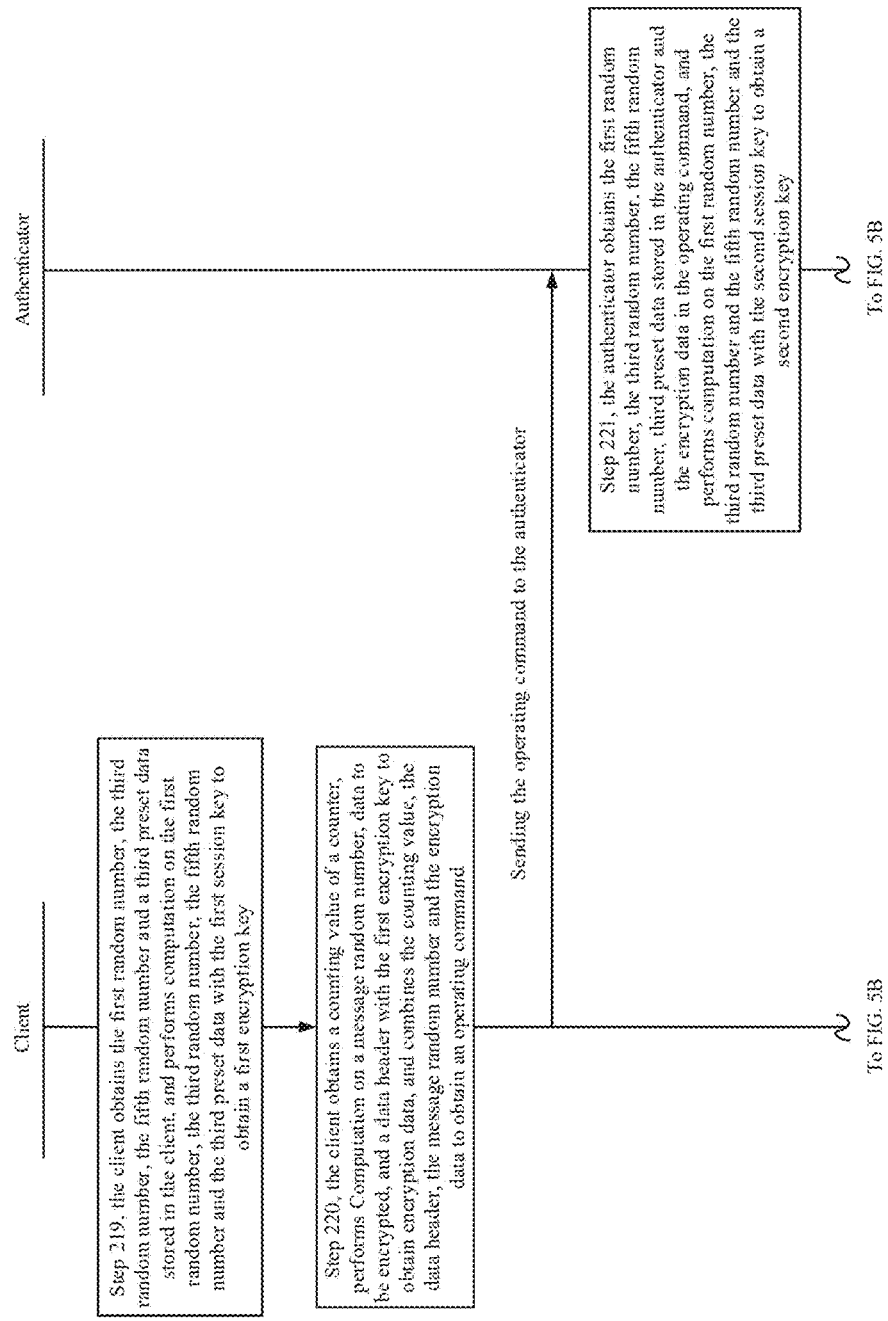
FIGS. 5A-5B are flow charts of a method for a data encryption phase in the method for communicating provided by Embodiment 2 of the present disclosure.
Figure 5B:
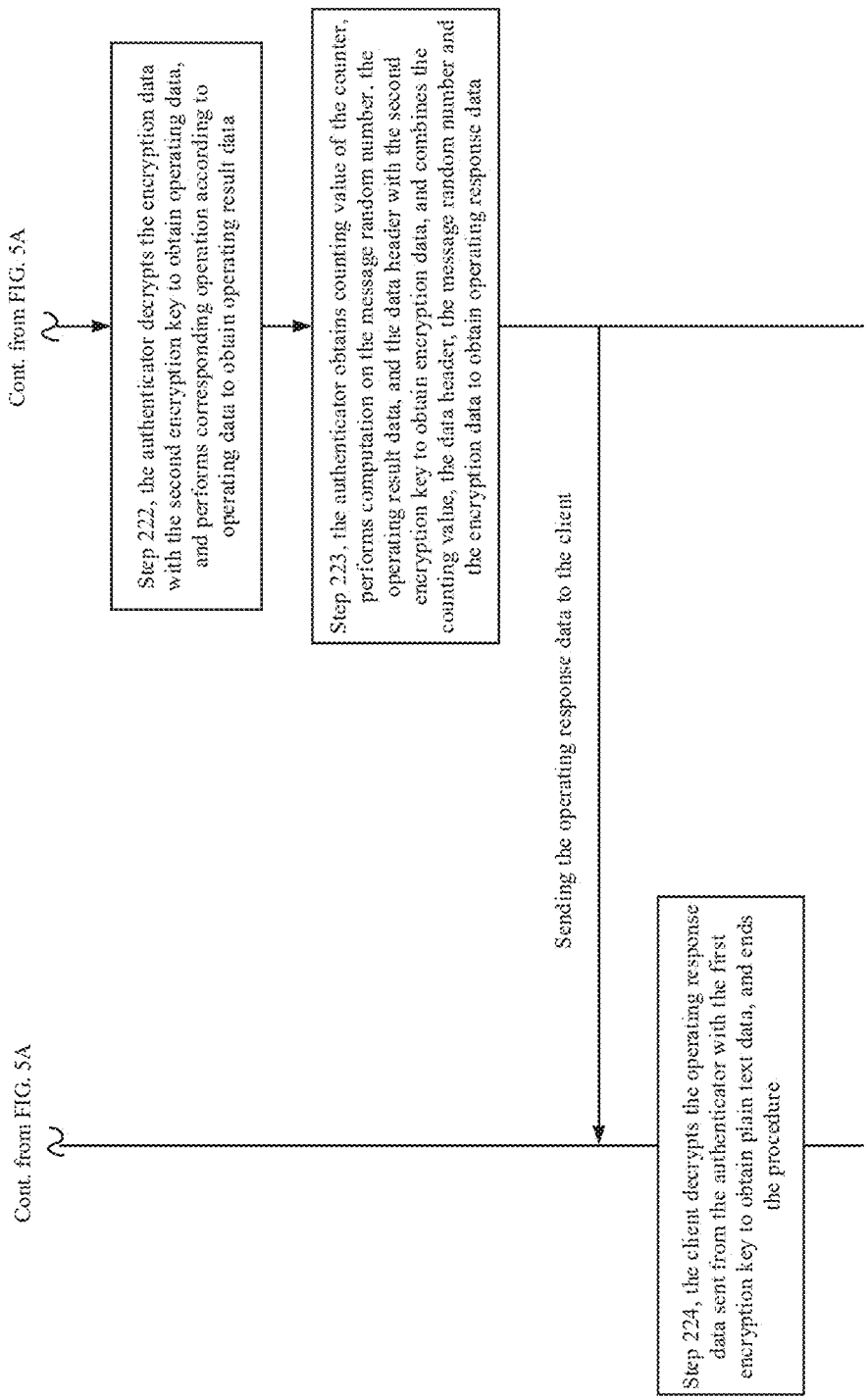

As shown by FIGS. 5A-5B, the data encryption phase includes the following steps.

Step 219, the client obtains the first random number, the third random number, the fifth random number and a third preset data stored in the client, and performs computation on the first random number, the third random number, the fifth random number and the third preset data with the first session key to obtain a first encryption key.

In the present embodiment, Step 219 specifically is: the client performing hash computation on the first random number, the third random number and the fifth random number to obtain a hash value, and performing computation on the hash value obtained by computing and the third preset data with the first session key to obtain a first encryption key.

Specifically, the performing computation on the hash value obtained by computing and the third preset data with the first session key to obtain the first encryption key specifically is: the client performing computation on the hash value obtained by computing and the third preset data with the first session key according to the third preset algorithm to obtain the first encryption key.

For example, the first random number specifically is a random number generated by the client at the session phase.

The third random number is a random number generated by the client at the handshake phase.

The fifth random number is a random number generated by the authenticator at the handshake phase.

The third preset data is: ASCII character string "FIDO caBLE v1 sessionKey".

The first encryption key is: 6D0D20CDFB8A55613AF009D804262CC673A78E1-E4293D1E1BF83B C7A54867ECC.

Step 220, the client obtains a counting value of a counter, performs computation on a message random number, data to be encrypted, and a data header with the first encryption key to obtain encryption data, combines the counting value, the data header, the message random number and the encryption data to obtain an operating command, and sends the operating command to the authenticator.

In the present embodiment, the client performing computation on the message random number, the data to be encrypted, and the data header to obtain the encryption data specifically is: the client performing computation on the message random number, the data to be encrypted, the data header with the first encryption key according to the fifth preset algorithm to obtain the encryption data.

Specifically, the message random number specifically is: combination of the random number of the session discovery phase, the counting value and the preset field counter.

The data header specifically is header, if the sender is the client, the header specifically is cmd, if the sender is the authenticator, the header specifically is STAT.

The STAT specifically is status (STAT) byte in FIDO BLE transmission protocol.

The fifth preset algorithm specifically is: Advanced Encryption Standard 256-bit-Galois/Counter Mode (AES-256-GCM).

The counter specifically is a 24-bit message counter: the counters on both the client side and the authenticator side are initialized to be zero and incremented at the same time after each message is sent.

For example, the counting value is: 0x00 (the client) or 0x01 (the authenticator);
for the data header, header=cmd or header=STAT:
for the message random number, messageNonce=nonce (8 bytes)||Sender (1 byte)||Counter (3 bytes);
for the encryption data, chiperDATA=AES256-GCM (key=sessionKey, nonce=messageNonce, plaintext=DATA', additionalData-Header, taglength=128):
assuming Plaintext=0808080808080808,
messageNonce=EB59387103AF03A500000001,
sessionKey 6D0D20CDFB8A55613AF009D804-262CC673A78E1E4293D1E1BF83BC7A54867 ECC:
then chiperdata=F5 47 0E 58 75 25 21 E1 74 63 CA 62 24 3E 2E E0 is obtained by computing; and
the operating command obtained by combining the counting value, the data header, message random number and the encryption data specifically is: 0x01+cmd+messagenonce+chiperdata.

Step 221, the authenticator obtains the first random number, the third random number, the fifth random number, third preset data stored in the authenticator and the encryption data in the operating command, and performs computation on the first random number, the third random number and the fifth random number and the third preset data with the second session key to obtain a second encryption key.

In the present embodiment, the performing computation on the first random number, the third random number and the fifth random number and the third preset data with the second session key to obtain the second encryption key specifically is: the authenticator performing hash computation on the first random number, the third random number and the fifth random number to obtain a hash value, and performing computation on the hash value obtained by computing and the third preset data with the second session key to obtain the second encryption key.

Specifically, the performing computation on the hash value obtained by computing and the third preset data with the second session key to obtain the second encryption key specifically is: the authenticator performing computation on the hash value obtained by computing and the third preset data with the second session key according to the third preset algorithm to obtain the second encryption key.

For example, the first random number specifically is a random number generated by the client at the session discovery phase.

The third random number specifically is a random number generated by the client at the handshake session.

The fifth random number specifically is a random number generated by the authenticator at the handshake session.

The third preset data is ASCII character string "FIDO caBLE v1 sessionKey".

The second encryption key is:
6D0D20CDFB8A55613AF009D804262CC673A78E-1E4293D1E1BF83B C7A54867ECC.

Step 222, the authenticator decrypts the encryption data with the second encryption key to obtain operating data, performs corresponding operation according to the operating data to obtain operating result data, and executes Step 223.

Step 223, the authenticator obtains the counting value of the counter, performs computation on the message random number, the operating result data, the data header with the second encryption key to obtain the encryption data, combines the counting value, the data header, the message random number and the encryption data to obtain operating response data, and sends the operating response data to the client.

In the present embodiment, the authenticator performing computation on the message random number, the operating result data, the data header with the second encryption key to obtain the encryption data specifically is: the authenticator performing computation on the message random number, the operating result data, the data header with the second encrypted key according to the fifth preset algorithm to obtain the encryption data.

Specifically, the message random number specifically is: combination of the first random number, the counting number and the preset field counter.

The data header specifically is header; if the sender is the client, the data header specifically is cmd: if the sender is the authenticator, the data header specifically is STAT.

The STAT specifically is a STAT byte in the FIDO BLE transmission protocol.

The fifth preset algorithm specifically is: AES256-GCM.

The counter specifically is a 24-bit message counter; the counters on both the client side and the authenticator side are initialized to be zero and incremented at the same time after each message is sent.

For example, the counting value is: 0x00 (client) or 0x01 (authenticator);
for the data header, header-cmd, or header-STAT:
for the message random number, messageNonce=nonce (8 bytes)||Sender (1 byte)||Counter (3 bytes);
for the encryption data, chiperDATA=AES256-GCM (key=sessionKey, nonce-messageNonce, plaintext= DATA', additionalData=Header, taglength=128);
assuming Plaintext=0808080808080808,
messageNonce=EB59387103AF03A501000001,
sessionKey    6D0D20CDFB8A55613AF009D804262-CC673A78E1E4293D1E1BF83BC7A54867 ECC:
then chiperdata=44 C6 F2 7E BC 14 9F 49 EE 88 29 DB 60 E4 70 D0 is obtained by computing; and
the operating response data obtained by combining the counting value, the data header, the message random number and the encryption data specifically is: 0x01+ cmd+messagenonce+chiperdata.

Step 224, the client decrypts the operating response data sent from the authenticator with the first encryption key to obtain plain text data, and ends the procedure.

In the present embodiment, if the authenticator cannot decrypt the encryption data sent from the client, the authenticator performs disconnection: similarly, if the client cannot decrypt the encryption data sent from the authenticator, the client performs disconnection.

Embodiment 3

Embodiment 3 of the present disclosure provides another method for communicating with an authenticator. The method is applied to a system including a client and an authenticator, where the client can be an application installed on a mobile terminal with the Bluetooth function. The method includes a session phase, a handshake phase and a communication encryption phase.

The present embodiment is a detailed process of communicating with the authenticator by a client, of which communicating is not for the first time. In this case, the session phase includes a session data establishment phase and a session discovery phase.

Figure 6A:
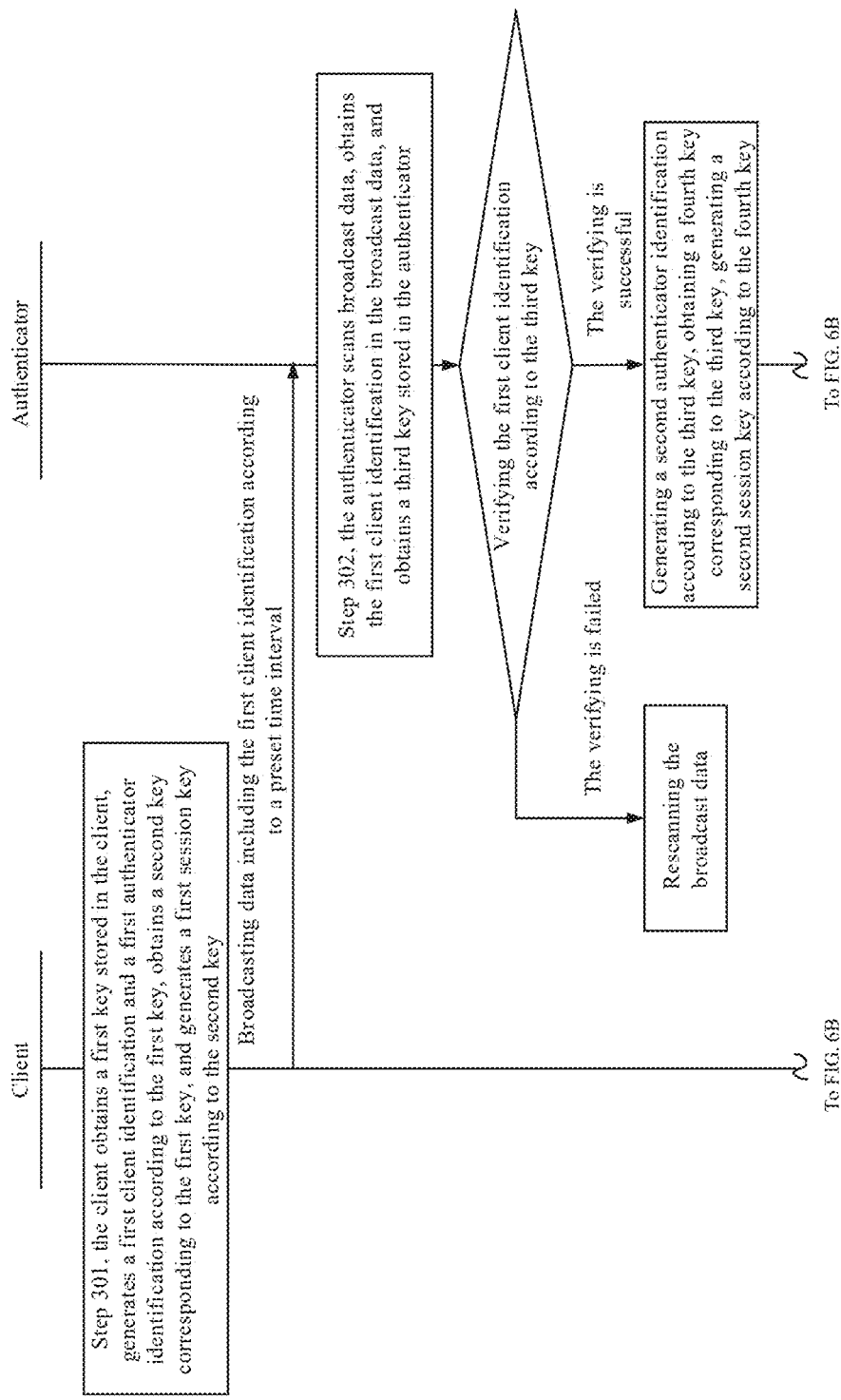
FIGS. 6A-6B are flow charts of a method for a session phase in the method for communicating provided by Embodiment 3 of the present disclosure.
Figure 6B:
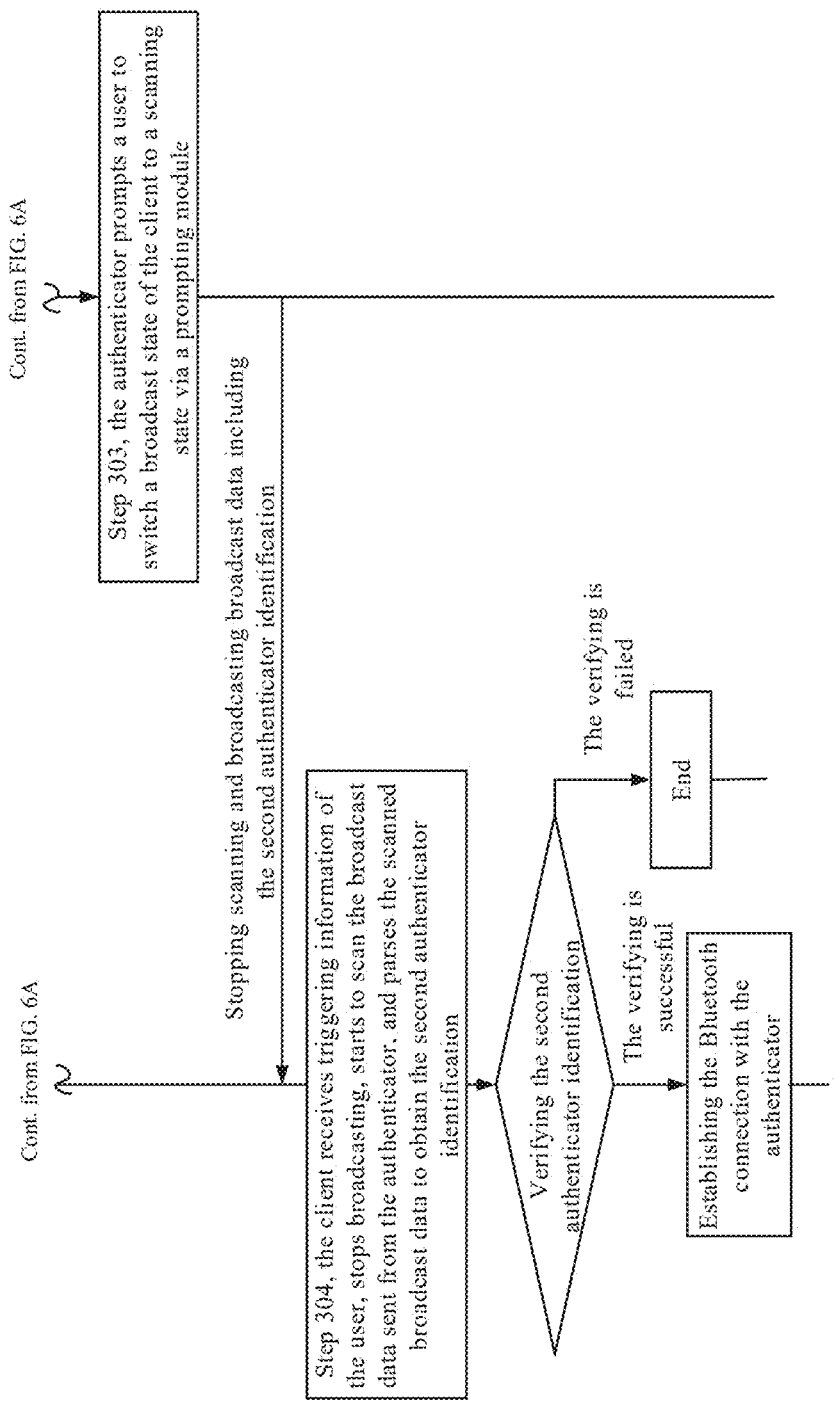

Specifically, as shown by FIGS. 6A-6B, the session phase includes the following steps.

Step 301, the client obtains a first key stored in the client, generates a first client identification and a first authenticator identification according to the first key, obtains a second key corresponding to the first key, generates a first session key according to the second key, and broadcasts data including the first client identification according to a preset time interval.

In the present embodiment, Step 301 specifically includes:

Step M1, The client obtains a first initial pairing key list stored in the client:

Step M2, the client obtains a first key in the first initial pairing key list in sequence, generates a first client identification and a first authenticator identification according to the first key, obtains a second key corresponding to the first key, and generates a first session key according to the second key;

Step M3, the client broadcasts data including the first client identification in sequence according to the preset time interval.

In the present embodiment, Step 301 specifically includes:

Step N1, the client obtains a first initial pairing key list stored in the client;

Step N2, the client takes a group of keys in the first initial pairing key list as a current key, obtains a first key and a second key in the current key, generates a first client identification and a first authenticator identification according to the first key, and generates a session key according to the second key:

Step N3, the client broadcasts data including the first client identification:

Step N4, the client determines whether a next group of keys exists, if yes, goes back to Step N2, otherwise, ends the procedure.

In the present embodiment, the generating the first client identification and the first authenticator identification according to the first key specifically includes: the client generating a first random number with preset length, obtains a stored first preset field and a stored second preset field, generating the first client identification according to the first random number, the first preset field and the first key, and generating the first authenticator identification according to the first client identification, the second preset field and the first key.

In an implementation, the client generating the first client identification according to the first random number, the first preset field and the first key specifically includes: the client concatenating the first preset field and the first random number in sequence, performing computation on the first preset field and the first random number with the first key according to a fourth preset algorithm to obtain first data, and concatenating the first random number and the first data as the first client identification.

The preset length of the first random number generated by the client is 8 bytes.

The first data obtained by computing is 8 bytes.

The fourth preset algorithm specifically is: HMAC-SHA256.

In an implementation, the generating the first authenticator identification according to the first client identification, the second preset field and the first key specifically is: the client concatenating the first client identification and the second preset field in sequence, performing computation on the first client identification and the second preset field with the first key according to the fourth preset algorithm to obtain second data, and taking the first 16 bytes of the second data as the first authenticator identification.

In the present embodiment, the generating the first session key according to the second key specifically includes: the client obtaining first preset data stored in the client, and generating the first session key according to the first random number, the first preset data and the second key.

In an implementation, the client generating the first session key according to the first random number, the first preset data and the second key specifically is: the client performing computation on the first random number and the first preset data with the second key according to a third preset algorithm to obtain the first session key.

The third preset algorithm is HKDF-SHA-256.

The first preset data is ASCII character string "FIDO caBLE v1 pairing data".

In the present embodiment, the client broadcasts data according to a preset broadcasting format, specifically, the first client identification is stored in a data item of the broadcast data, specifically, stored in Service Data item.

Step 302, the authenticator scans the broadcast data, obtains the first client identification in the broadcast data, obtains a third key stored in the authenticator, verifies the first client identification according to the third key, generates a second authenticator identification according to the third key, obtains a fourth key corresponding to the third key, generates a second session key according to the fourth key, and executes Step 303 if the verifying is successful, rescans the broadcast data if the verifying is failed.

In the present embodiment, Step 302 specifically includes: the authenticator scanning the broadcast data, obtaining the first client identification in the broadcast data, obtaining a third key in a second initial pairing key list stored in the authenticator in sequence, verifying the first authenticator identification with the obtained third key, generating a second authenticator identification according to the obtained third key that successfully verifies the first authenticator identification, obtaining a fourth key corresponding to the third key, and generating a second session key according to the fourth key, executing Step 303 if the verifying is successful, rescanning the broadcast data if all third keys in the second initial pairing key list fail to verify the first client identification.

In the present embodiment, after the authenticator sends an extension register response to the client, the method further includes: the authenticator enables scanning.

In the present embodiment, the verifying the first client identification with the third key specifically is: the authenticator obtaining a first preset field stored in the authenticator, a first random number and first data in the first authenticator identification, performing computation on the first preset field and the first random number with the third key according to a fourth preset algorithm to obtain second data, and determining whether the second data and the first data are identical, if yes, the verifying is successful, otherwise, the verifying is failed.

Specifically, the verifying the first client identification with the third key specifically is: the authenticator taking the first 8 bytes of the first client identification as the first random number and taking the last 8 bytes of the first client identification as the first data, performing computation on the first preset field and the first random number with the third key to obtain the second data, and determining whether the second data and the first data are identical, if yes, the verifying is successful; otherwise, the verifying is failed.

In an implementation, the authenticator generating the second authenticator identification according to the third key specifically is: the authenticator obtaining a second preset field stored in the authenticator, concatenating the first client identification and the second preset field in sequence, performing computation on the first client identification and the second preset field with the third key according to the fourth preset algorithm to obtain fourth data, and taking a preset byte in the fourth data as the authenticator identification.

In the present embodiment, specifically, the preset byte is the first 16 bytes.

In an implementation, the generating the second session key according to the fourth key specifically is: the authenticator obtaining first preset data stored in the authenticator, and performing computation on the first random number and the first preset data with the fourth key according to a third preset algorithm to obtain the second session key.

Step 303, the authenticator prompts a user to switch a broadcast state of the client to a scanning state via a prompting module, stops scanning and broadcasts broadcast data including the second authenticator identification.

In the present embodiment, the authenticator broadcasts broadcast data according a preset broadcast format, specifically, the second authenticator identification is stored in a data item of the broadcast data, specifically, stored in Service Data item.

Step 304, the client receives triggering information of the user, stops broadcasting, starts to scan the broadcast data sent from the authenticator, parses the scanned broadcast data to obtain the second authenticator identification, and verifies the second authenticator identification, establishes the Bluetooth connection with the authenticator if the verifying is successful, ends the procedure if the verifying is failed.

In the present embodiment, the verifying the second authenticator identification specifically is: the client determining whether the obtained second authenticator identification and the first authenticator identification corresponding to the broadcasted first client identification are identical, if yes, the verifying is successful, otherwise, the verifying is failed.

In the present embodiment, the handshake phase and the communication encryption phase in the communication process between the client and the authenticator is as same as that of Embodiment 2, no more detail is given here.

The advantages of the technical solutions of provided by the embodiments of the present disclosure are: based on the Bluetooth connection between devices, the present disclosure adapts the client application-level Bluetooth pairing connection, where the client and the authenticator perform bidirectional broadcast scanning authentication during the connection process, generate an encryption key according to a negotiation key after successful verifying and connecting, and encrypt the data during the communication process through the encryption key to ensure that the data is not stolen during the transmission process. By using the method provided by the present disclosure, data security is enhanced in the transmission process, thus the interests of users are ensured.

Embodiment 4

Figure 7:
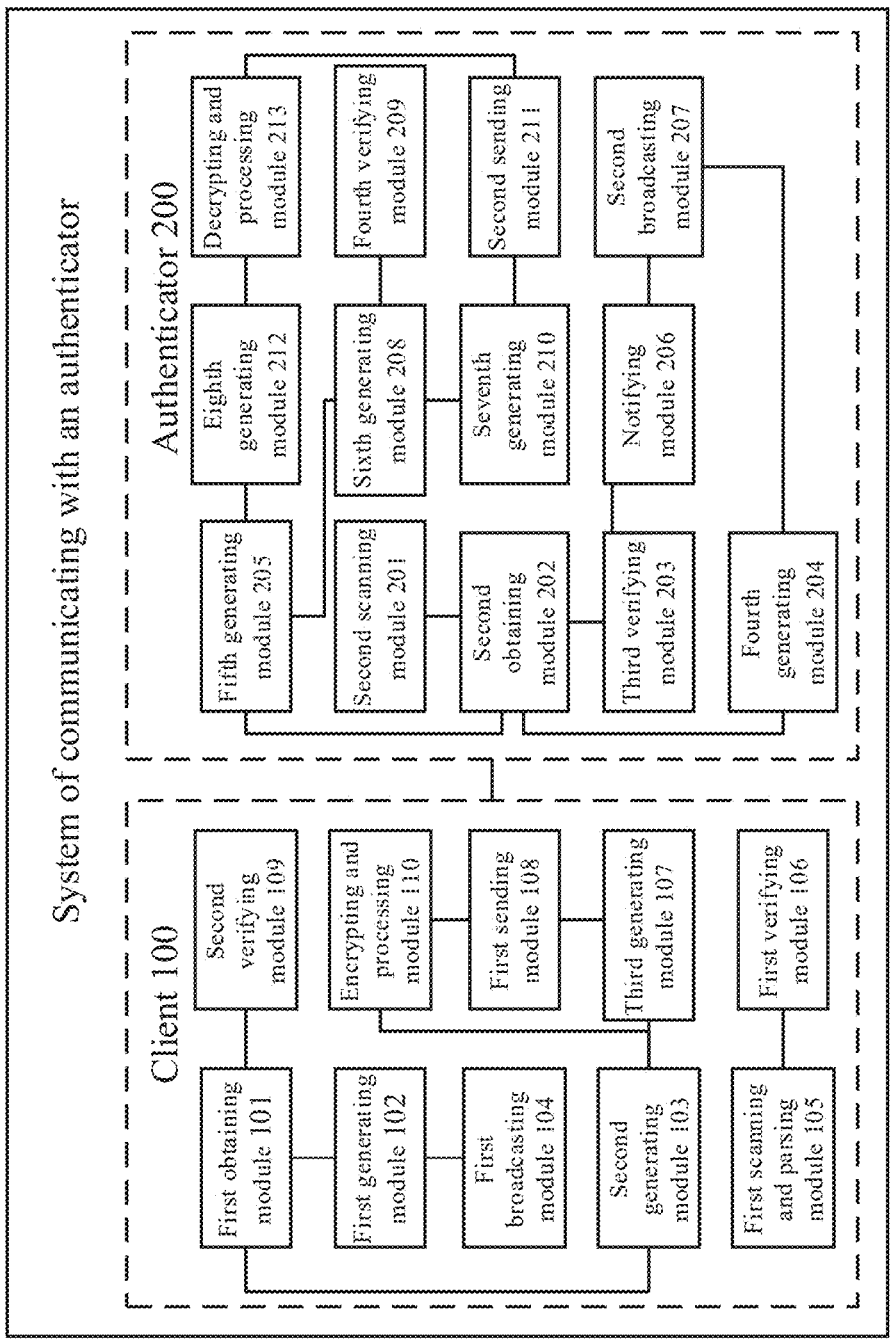
FIG. 7 is a block diagram of a system for communicating with an authenticator provided by Embodiment 4 of the present disclosure.

Embodiment 4 of the present disclosure provides a system for communicating with an authenticator, as shown by FIG. 7, the system includes a client 100 and an authenticator 200;
in one aspect, the client 100 includes:
a first obtaining module 101, configured to obtain a first key stored in the client:
a first generating module 102, configured to generate a first client identification and a first authenticator identification according to the first key:
the first obtaining module 101 is further configured to obtain a second key corresponding to the first key:
a second generating module 103, configured to generate a first session key according to the second key:
a first broadcasting module 104, configured to broadcast data including the first client identification according to a preset time interval;
a first scanning and parsing module 105, configured to stop broadcasting, start to scan broadcast data sent from the authenticator, and parse the broadcast data obtained by scanning:
a first verifying module 106, configured to verify the second authenticator identification:
a third generating module 107, configured to obtain a first handshake key by computation with the first session key, and perform computation on the client data with the first handshake key to obtain a client data digest value:
a first sending module 108, configured to send a handshake command including the client data and the client data digest value to the authenticator;
the first obtaining module 101 is further configured to obtain authenticator data and the authenticator digest value according to a handshake response:
a second verifying module 109, configured to verify the authenticator data according to the first handshake key, the authenticator data and the authenticator digest value;
an encrypting and processing module 110, configured to obtain a first encryption key by computation with the first session key, perform computation on operating data with the first encryption key to obtain encryption data:
the first sending module 108 is further configured to send an operating command including the encryption data to the authenticator;
in another aspect, the authenticator 200 includes:
a second scanning module 201, configured to scan the broadcast data and obtain the first client identification from the broadcast data:
a second obtaining module 202, configured to obtain a third key stored in the authenticator:
a third verifying module 203, configured to verify the first client identification according to the third key:

a fourth generating module 204, configured to generate a second authenticator identification according to the third key:
the second obtaining module 202 is further configured to obtain a fourth key corresponding to the third key:
a fifth generating module 205, configured to generate a second session key according to the fourth key:
a notifying module 206, configured to notify that verifying the first client identification is successful;
a second broadcasting module 207, configured to stop scanning and broadcast the broadcast data including the second authenticator identification:
the second obtaining module 202 is further configured to obtain the client data and the client data digest value according to the handshake command;
a sixth generating module 208, configured to obtain a second handshake key by computation with the second session key:
a fourth verifying module 209, configured to verify the client data according to the second handshake key, the client data and the client data digest value:
a seventh generating module 210, configured to perform computation on the authenticator data with the second handshake key to obtain an authenticator data digest value:
a second sending module 211, configured to send the handshake response including the authenticator data and the authenticator data digest value to the client;
the second obtaining module 202 is further configured to obtain the encryption data in the operating command:
an eighth generating module 212, configured to obtain a second encryption key by computation with the second session key:
a decrypting and processing module 213, configured to decrypt the encryption data with the second encryption key to obtain operating data, perform corresponding operation according to the operating data to obtain operating result data, and perform computation on the operating result data with the second encryption key to obtain operating response data:
the second sending module 211 is further configured to send an operating response including the operating response data to the client.
In an implementation, client 100 further includes:
the first generating and sending module, configured to generate a client key pair, and send an extension register command to the authenticator, where the extension register command includes a client version number and a client public key in the client key pair;
a first obtaining and generating module, configured to obtain an authenticator public key and a client version number in an extension register response, and generate a first parameter according to a client private key in the client key pair and the authenticator public key:
the first obtaining and generating module is further configured to obtain first preset data stored in the client, generate a first initial paring key according to the client public key, the authenticator public key, the client version number, the first preset data and the first parameter, split the first initial paring key to obtain a first key and a second key, and store the first key and the second key correspondingly.
In the present embodiment, the authenticator 200 further includes:
a second obtaining and generating module, configured to obtain the client public key and the client version number in the extension register command, generate an authenticator key pair, and generate a second parameter according to the client public key and an authenticator private key in the authenticator key pair;

the second obtaining and generating module is further configured to obtain a first preset data stored in the authenticator, generate a second initial pairing key according to the client public key, an authenticator public key in the authenticator key pair, the client version number, the first preset data and the second parameter, split the second initial paring key to obtain a third key and a fourth key, and store the third key and the fourth key correspondingly:

the second sending module 211 is further configured to send an extension register response to the client, where the extension register response includes the authenticator public key and the client number version.

In an implementation, the first generating module 102 specifically includes a first generating and obtaining unit, a first generating unit and a second generating unit:

the first generating and obtaining unit is configured to generate a first random number with preset length, and obtain a first preset field stored and a second preset field stored:

the first generating unit is configured to generate a first client identification according to the first random number, the first preset field and the first key:

the second generating unit is configured to generate a first authenticator identification according to the first client identification, the second preset field and the first key.

In an implementation, the first generating unit is specifically configured to concatenate the first preset field and the first random number in sequence, perform computation on the first preset field and the first random number with the first key according to a fourth preset algorithm to obtain first data, and concatenate the first random number and the first data to obtain a first client identification.

In an implementation, the second generating unit is specifically configured to concatenate the first client identification and the second preset field in sequence, perform computation on the first client identification and the second preset field with the first key according to a fourth algorithm to obtain third data, and obtain a preset byte in the third data as a first authenticator identification.

In an implementation, the second generating module 103 is specifically configured to obtain first preset data stored in the client, and perform computation on the first random number and the first preset data with the second key according to a third preset algorithm to obtain a first session key.

In an implementation, the third verifying module 203 is specifically configured to obtain a first preset field stored in the authenticator, a first random number and first data in the first client identification, perform computation on the first preset field and the first random number with the third key according to a fourth preset algorithm to obtain second data, and determine whether the second data is identical to the first data.

In an implementation, the fourth generating module 204 is specifically configured to obtain a second preset field stored in the authenticator, concatenate the first client identification and the second preset field in sequence, perform computation on the first client identification and the second preset field with the third key according to a fourth preset algorithm to obtain fourth data, and obtain a preset byte in the fourth data as the second authenticator identification.

In an implementation, the fifth generating module 205 is specifically configured to obtain first preset data stored in the authenticator, and perform computation on the first random number and the first preset data with the fourth key according to a third preset algorithm to obtain the second session key.

In an implementation, the first verifying module 106 is specifically configured to compare the second authenticator identification with the first authenticator identification, where the verifying is successful if there is consistent comparison, otherwise, the verifying is failed.

In an implementation, the third generating module 107 is specifically configured to obtain a second random number and second preset data stored in the client, and perform computation on the second random number and the second preset data with the first session key according to a third preset algorithm to obtain the first handshake key.

In an implementation, the sixth generating module 208 is specifically configured to obtain a fourth random number and second preset data stored in the authenticator, and perform computation on the fourth random number and the second preset data with the second session key according to a third preset algorithm to obtain the second handshake key.

In an implementation, the notifying module 206 is specifically configured to establish the Bluetooth connection with the client, and trigger the second broadcasting module 207 when the Bluetooth connection is disconnected.

In an implementation, the authenticator further includes a sending and receiving module, where the sending and receiving module is configured to send a first unique identification address to the client, and receive a second unique identification address sent from the client:

where the broadcast data broadcast by the second broadcasting module 207 further includes the first unique identification address and the second unique identification address;

the first scanning and parsing module 105 is specifically configured to stop broadcasting, start to scan broadcast data including the first unique identification address and the second unique identification address, and parse the broadcast data obtained by scanning;

the first verifying module 106 is specifically configured to verify the second authenticator identification, and establish the connection with the authenticator if the verifying is successful.

In an implementation, the notifying module 206 is specifically configured to prompt the prompting module to switch a broadcast state of the client to a scanning state.

The method and system for communicating with an authenticator provided by the present disclosure is introduced in detail above. The principle and embodiment of the present disclosure is elaborated in the application of specific examples herein. The above description of the embodiments is merely to assist in understanding the method of the present disclosure and its core idea. At the same time, one of ordinary skill in the art might make various modifications on specific embodiments and its application scope according to the idea of the present disclosure. Thus, the content of the description above is not limit to the present disclosure.

What is claimed is:

1. A method for communicating with an authenticator, comprising:

Step S1, obtaining, by a client, a first key stored in the client, generating a first client identification and a first authenticator identification according to the first key, obtaining a second key corresponding to the first key, generating a first session key according to the second key, and broadcasting data comprising the first client identification according to a preset time interval;

Step S2, scanning, by the authenticator, the broadcast data, obtaining the first client identification in the broadcast data, obtaining a third key stored in the authenticator, verifying the first client identification according to the third key, executing Step S3 when the verifying of the first client identification is successful, rescanning the broadcast data when the verifying of the first client identification is failed;

Step S3, generating, by the authenticator, a second authenticator identification according to the third key, obtaining a fourth key corresponding to the third key, generating a second session key according to the fourth key, notifying that the verifying of the first client identification is successful, stopping scanning, and broadcasting broadcast data comprising the second authenticator identification;

Step S4, stopping, by the client, broadcasting from the client, starting to scan the broadcast data sent from the authenticator, parsing the broadcast data sent from the authenticator that obtained by scanning to obtain the second authenticator identification, and verifying the second authenticator identification, establishing a short-range communication connection with the authenticator and executing Step S5 when the verifying of the second authenticator identification is successful, ending the method when the verifying of the second authenticator identification is failed;

Step S5, obtaining, by the client, a first handshake key by computation with the first session key, performing computation on client data with the first handshake key to obtain a client data digest value, and sending a handshake command comprising the client data and the client data digest value to the authenticator;

Step S6, obtaining, by the authenticator, the client data and the client data digest value according to the handshake command, obtaining a second handshake key by computation with the second session key, verifying the client data according to the second handshake key, the client data and the client data digest value, performing computation on authenticator data with the second handshake key to obtain an authenticator data digest value when the verifying of the client data is successful, and sending a handshake response comprising the authenticator data and the authenticator data digest value to the client;

Step S7, obtaining, by the client, the authenticator data and the authenticator data digest value according to the handshake response, and verifying the authenticator data according to the first handshake key, the authenticator data and the authenticator digest value, executing Step S8 in case of a successful handshake when the verifying of the authenticator data is successful; otherwise, performing disconnection;

Step S8, obtaining, by the client, a first encryption key by computation with the first session key, performing computation on operating data with the first encryption key to obtain encryption data, and sending an operating command comprising the encryption data to the authenticator; and Step S9, obtaining, by the authenticator, the encryption data in the operating command, obtaining a second encryption key by computation with the second session key, decrypting the encryption data with the second encryption key to obtain operating data, performing a corresponding operation according to the operating data to obtain operating result data, performing computation on the operating result data with the second encryption key to obtain operating response data, and sending an operating response comprising the operating response data to the client.

2. The method according to claim 1, before Step S1, further comprising:

Step A1, generating, by the client, a client key pair, sending an extension register command to the authenticator, wherein the extension register command comprises a client version number and a client public key in the client key pair;

Step A2, obtaining, by the authenticator, the client public key and the client version number in the extension register command, generating an authenticator key pair, and generating a second parameter according to the client public key and an authenticator private key in the authenticator key pair;

Step A3, obtaining, by the authenticator, first preset data stored in the authenticator, generating a second initial pairing key according to the client public key, an authenticator public key in the authenticator key pair, the client version number, the first preset data stored in the authenticator and the second parameter, splitting the second initial paring key to obtain a third key and a fourth key, and storing the third key and the fourth key correspondingly;

Step A4, sending, by the authenticator, an extension register response to the client, wherein the extension register response comprises the authenticator public key and the client version number;

Step A5, obtaining, by the client, the authenticator public key and the client version number in the extension register response, and generating a first parameter according to a client private key in the client key pair and the authenticator public key; and Step A6, obtaining, by the client, first preset data stored in the client, generating a first initial paring key according to the client public key, the authenticator public key, the client version number, the first preset data stored in the client and the first parameter, splitting the first initial paring key to obtain a first key and a second key, and storing the first key and the second key correspondingly.

3. The method according to claim 1, wherein the verifying the first client identification according to the third key specifically is: obtaining, by the authenticator, a first preset field stored in the authenticator, a first random number and first data in the first client identification, performing computation on the first preset field and the first random number with the third key according to a fourth preset algorithm to obtain second data, determining whether the second data is identical to the first data, when the second data is identical to the first data, the verifying of the first client identification is successful, otherwise, the verifying of the first client identification is failed.

4. The method according to claim 3, wherein the generating the second session key according to the fourth key specifically is: obtaining, by the authenticator, first preset data stored in the authenticator, and performing computation on the first random number and the first preset data stored in the authenticator with the fourth key according to a third preset algorithm to obtain the second session key.

5. The method according to claim 1, wherein the generating, by the authenticator, the second authenticator identification according to the third key specifically is: obtaining, by the authenticator, a second preset field stored in the authenticator, concatenating the first client identification and the second preset field in sequence, performing computation on the first client identification and the second preset field with the third key according to a fourth preset algorithm to obtain fourth data, and obtaining a preset byte in the fourth data as the second authenticator identification.

6. The method according to claim 1, wherein the verifying the second authenticator identification specifically is: comparing, by the client, the second authenticator identification with the first authenticator identification, wherein the verifying of the second authenticator identification is successful when there is consistent comparison, otherwise, the verifying of the second authenticator identification is failed.

7. The method according to claim 1, wherein the obtaining, by the client, the first handshake key by computation with the first session key specifically is: obtaining, by the client, a second random number and second preset data stored in the client, and performing computation on the second random number and the second preset data stored in the client with the first session key according to a third preset algorithm to obtain the first handshake key.

8. The method according to claim 1, wherein the obtaining the second handshake key by computation with the second session key specifically is: obtaining, by the authenticator, a fourth random number and second preset data stored in the authenticator, performing computation on the fourth random number and the second preset data stored in the authenticator with the second session key according to a third preset algorithm to obtain the second handshake key.

9. The method according to claim 1, wherein in Step S3, the notifying that the verifying of the first client identification is successful, stopping scanning, and broadcasting the broadcast data comprising the second authenticator identification specifically is: establishing, by the authenticator, the short-range communication connection with the client, broadcasting the broadcast data comprising the second authenticator identification when the short-range communication connection is disconnected.

10. The method according to claim 9, after the establishing, by the authenticator, the short-range communication connection with the client, further comprising: sending, by the authenticator, a first unique identification address to the client, and receiving a second unique identification address sent from the client;
wherein the broadcast data sent from the authenticator further comprises the first unique identification address and the second unique identification address;
Step S4 specifically comprises: stopping, by the client, broadcasting, starting to scan the broadcast data sent from the authenticator comprising the first unique identification address and the second unique identification address, parsing the broadcast data sent from the authenticator obtained by scanning to obtain the second authenticator identification, and verifying the second authenticator identification, establishing the short-range communication connection with the authenticator and executing Step S5 when the verifying of the second authenticator identification is successful, ending the procedure when the verifying of the second authenticator identification is failed.

11. A system for communicating with an authenticator, comprising a client and an authenticator, wherein the client comprises a first processor and a first memory, the authenticator comprises a second processor and a second memory, wherein the first memory and the second memory store computer programs that are executed by the first processor and the second processor;

the first processor is configured to:
obtain a first key stored in the client;
generate a first client identification and a first authenticator identification according to the first key;
obtain a second key corresponding to the first key;
generate a first session key according to the second key;
broadcast data comprising the first client identification according to a preset time interval;
stop broadcasting, start to scan broadcast data sent from the authenticator, and parse the broadcast data sent from the authenticator that obtained by scanning;
verify a second authenticator identification;
obtain a first handshake key by computation with the first session key, and perform computation on the client data with the first handshake key to obtain a client data digest value;
send a handshake command comprising the client data and the client data digest value to the authenticator;
obtain authenticator data and a authenticator digest value according to a handshake response;
verify the authenticator data according to the first handshake key, the authenticator data and the authenticator digest value;
obtain a first encryption key by computation with the first session key, and perform computation on operating data with the first encryption key to obtain encryption data; and
send an operating command comprising the encryption data to the authenticator;
the second processor is configured to:
scan the broadcast data sent from the client and obtain the first client identification from the broadcast data sent from the client;
obtain a third key stored in the authenticator;
verify the first client identification according to the third key;
generate a second authenticator identification according to the third key;
obtain a fourth key corresponding to the third key;
generate a second session key according to the fourth key;
notify that the verifying of the first client identification is successful;
stop scanning and broadcast the broadcast data sent from the authenticator comprising the second authenticator identification;
obtain the client data and the client data digest value according to the handshake command;
obtain a second handshake key by computation with the second session key;
verify the client data according to the second handshake key, the client data and the client data digest value;
perform computation on the authenticator data with the second handshake key to obtain an authenticator data digest value;
send the handshake response comprising the authenticator data and the authenticator data digest value to the client;
obtain the encryption data in the operating command;
obtain a second encryption key by computation with the second session key;
decrypt the encryption data with the second encryption key to obtain operating data, perform a corresponding operation according to the operating data to obtain operating result data, and perform computation on the operating result data with the second encryption key to obtain operating response data; and
send an operating response comprising the operating response data to the client.

12. The system according to claim 11, wherein the first processor is further configured to:
- generate a client key pair, send an extension register command to the authenticator, wherein the extension register command comprises a client version number and a client public key in the client key pair;
- obtain an authenticator public key and a client version number in an extension register response, and generate a first parameter according to a client private key in the client key pair and the authenticator public key; and
- obtain first preset data stored in the client, generate a first initial paring key according to the client public key, the authenticator public key, the client version number, the first preset data stored in the client and the first parameter, split the first initial paring key to obtain a first key and a second key, and store the first key and the second key correspondingly;

the second processor is further configured to:
- obtain the client public key and the client version number in the extension register command, generate an authenticator key pair, and generate a second parameter according to the client public key and an authenticator private key in the authenticator key pair;
- obtain first preset data stored in the authenticator, generate a second initial pairing key according to the client public key, an authenticator public key in the authenticator key pair, the client version number, the first preset data stored in the authenticator and the second parameter, split the second initial paring key to obtain a third key and a fourth key, and store the third key and the fourth key correspondingly; and
- send the extension register response to the client, wherein the extension register response comprises the authenticator public key and the client version number.

13. The system according to claim 11, wherein the second processor is further configured to obtain a first preset field stored in the authenticator, a first random number and first data in the first client identification, perform computation on the first preset field and the first random number with the third key according to a fourth preset algorithm to obtain second data, determine whether the second data is identical to the first data.

14. The system according to claim 13, wherein the second processor is further configured to obtain first preset data stored in the authenticator, and perform computation on the first random number and the first preset data stored in the authenticator with the fourth key according to a third preset algorithm to obtain the second session key.

15. The system according to claim 11, wherein the second processor is further configured to obtain a second preset field stored in the authenticator, concatenate the first client identification and the second preset field in sequence, perform computation on the first client identification and the second preset field with the third key according to a fourth preset algorithm to obtain fourth data, and obtain a preset byte in the fourth data as the second authenticator identification.

16. The system according to claim 11, wherein the first processor is further configured to compare the second authenticator identification with the first authenticator identification, wherein the verifying of the second authenticator is successful when there is consistent comparison, otherwise, the verifying of the second authenticator is failed.

17. The system according to claim 11, wherein the first processor is further configured to obtain a second random number and second preset data stored in the client, and perform computation on the second random number and the second preset data stored in the client with the first session key according to a third preset algorithm to obtain the first handshake key.

18. The system according to claim 11, wherein the second processor is further configured to obtain a fourth random number and second preset data stored in the authenticator, and perform computation on the fourth random number and the second preset data stored in the authenticator with the second session key according to a third preset algorithm to obtain the second handshake key.

19. The system according to claim 11, wherein the second processor is further configured to establish a short-range communication connection with the client, and broadcast the broadcast data comprising the second authenticator identification when the short-range communication connection is disconnected.

20. The system according to claim 19, wherein the second processor is further configured to send a first unique identification address to the client, and receive a second unique identification address sent from the client;
- wherein the broadcast data sent from the authenticator further comprises the first unique identification address and the second unique identification address;
- the client is further configured to stop broadcasting, start to scan the broadcast data sent from the authenticator comprising the first unique identification address and the second unique identification address, and parse the broadcast data sent from the authenticator obtained by scanning; and
- the client is further configured to verify the second authenticator identification, and establish the short-range communication connection with the authenticator when the verifying of the second authenticator identification is successful.

* * * * *